US012728555B2

(12) United States Patent
Zhao et al.

(10) Patent No.: US 12,728,555 B2
(45) Date of Patent: Sep. 8, 2026

(54) HANDHELD POWER TOOL

(71) Applicant: Greenworks (Jiangsu) Co., Ltd., Changzhou (CN)

(72) Inventors: Dong Zhao, Changzhou (CN); Duoduo Sha, Changzhou (CN); Lingao Zhang, Changzhou (CN); Stefan La, Jönköping (SE); Andreas Carlsson, Skövde (SE); Ola Agne, Taberg (SE); Thomas Arnell, Huskvarna (SE); Goran Vucic, Jönköping (SE)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 232 days.

(21) Appl. No.: 18/509,256

(22) Filed: Nov. 14, 2023

(65) Prior Publication Data

US 2024/0100729 A1 Mar. 28, 2024

Related U.S. Application Data

(63) Continuation of application No. PCT/CN2022/093986, filed on May 19, 2022.

(30) Foreign Application Priority Data

May 21, 2021 (CN) .......................... 202121111633.1
Dec. 1, 2021 (CN) .......................... 202122995789.7
(Continued)

(51) Int. Cl.
*B26D 7/24* (2006.01)
*B25F 5/02* (2006.01)
*B26D 5/08* (2006.01)

(52) U.S. Cl.
CPC ................ *B26D 7/24* (2013.01); *B25F 5/029* (2013.01); *B26D 5/086* (2013.01)

(58) Field of Classification Search
CPC .................................... H01H 3/20; B26D 7/24
See application file for complete search history.

(56) References Cited

U.S. PATENT DOCUMENTS 5,969,312 A 10/1999 Svetlik et al.
6,555,773 B1 * 4/2003 Broghammer ........... H01H 3/20 200/50.01
(Continued)

FOREIGN PATENT DOCUMENTS

CN 101454124 B 8/2010
CN 205884214 U 1/2017
(Continued)

*Primary Examiner* — Ghassem Alie
*Assistant Examiner* — Richard D Crosby, Jr.

(57) ABSTRACT

The disclosure provides a handheld power tool, which at least includes a housing assembly, a handle assembly and a switch assembly. The switch assembly includes a button assembly and a push-pull assembly. When the push-pull assembly is configured to complete at least two actions, the button assembly is unlocked, the first action is to slide back and forth along the handle assembly, and the second action is to slide back and forth obliquely along the handle assembly. With the handheld power tool of the disclosure, a trigger switch can be unlocked by a palm, so as to improve a problem of poor comfort during use caused by unlocking the trigger switch by a thumb.

20 Claims, 20 Drawing Sheets

(30) Foreign Application Priority Data

| | | |
|---|---|---|
| Dec. 1, 2021 | (CN) | 202123001206.0 |
| Dec. 1, 2021 | (CN) | 202123001234.2 |
| Dec. 1, 2021 | (CN) | 202123113789.6 |
| Dec. 2, 2021 | (CN) | 202123006937.4 |
| Dec. 2, 2021 | (CN) | 202123044469.X |
| Dec. 2, 2021 | (CN) | 202123046871.1 |

(56) References Cited

U.S. PATENT DOCUMENTS

| | | | | |
|---|---|---|---|---|
| 8,176,643 | B2 * | 5/2012 | Harada | B27B 17/083 188/77 R |
| 9,353,721 | B2 * | 5/2016 | Eberle | F02N 15/027 |
| 9,868,199 | B2 * | 1/2018 | Milbourne | B24B 23/03 |
| 9,978,541 | B2 * | 5/2018 | Mizutani | B25F 5/00 |
| 10,818,450 | B2 * | 10/2020 | Moreland, IV | B25F 5/02 |
| 10,875,108 | B2 * | 12/2020 | Hart | B23D 47/025 |
| 11,141,828 | B2 * | 10/2021 | Kolb | B25F 5/02 |
| 12,064,860 | B2 * | 8/2024 | Mandel | B25F 5/02 |
| 2010/0078298 | A1 * | 4/2010 | Freundt | H01H 9/26 200/43.18 |
| 2014/0174772 | A1 * | 6/2014 | Mandalka | B27B 17/0008 173/1 |
| 2015/0170848 | A1 * | 6/2015 | Kannan | H01H 3/20 200/43.17 |
| 2022/0020542 | A1 * | 1/2022 | Vucic | H01H 9/06 |
| 2022/0093353 | A1 * | 3/2022 | Wang | H01H 3/20 |

FOREIGN PATENT DOCUMENTS

| | | | |
|---|---|---|---|
| CN | 210615356 | U | 5/2020 |
| CN | 111710545 | A | 9/2020 |
| CN | 216229214 | U | 4/2022 |
| CN | 216299207 | U | 4/2022 |
| CN | 216312564 | U | 4/2022 |
| CN | 216399528 | U | 4/2022 |
| CN | 216422868 | U | 5/2022 |
| CN | 216442711 | U | 5/2022 |
| EP | 2957391 | A1 | 12/2015 |
| TW | M599237 | U | 8/2020 |

* cited by examiner

HANDHELD POWER TOOL

CROSS REFERENCE TO RELATED APPLICATION

The present application is a Continuation Application of PCT application No. PCT/CN2022/093986 filed on May 19, 2022, which claims the benefit of CN202121111633.1 filed on May 21, 2021, CN202123044469.X filed on Dec. 2, 2021, CN202123001234.2 filed on Dec. 1, 2021, CN202123113789.6 filed on Dec. 1, 2021, CN202123006937.4 filed on Dec. 2, 2021, CN202122995789.7 filed on Dec. 1, 2021, CN202123046871.1 filed on Dec. 2, 2021, CN202123001206.0 filed on Dec. 1, 2021. All the above are hereby incorporated by reference.

TECHNICAL FIELD

The disclosure relates to a technical field of power tools, in particular to a handheld power tool.

BACKGROUND

In order to avoid harm to the human body caused by misoperation when using some power tools, garden tools or gasoline engine tools, the safety regulations stipulate that there must be two actions to turn on the microswitches on the above three types of tools. Therefore, the above three types of tools often use a lock button to lock the switch trigger. When starting the tool, the lock button must be unlocked first, and then the switch trigger is pulled to trigger the micro switch to start the tool.

At present, the starting of power tools is mostly performed by the thumb, and it takes three actions to start the whole machine, especially the side starting structure. Although it can meet the relevant safety regulations, this structure is not comfortable to use.

SUMMARY

A purpose of the disclosure is to provide a handheld power tool. The handheld power tool can unlock a trigger switch by a palm, so as to improve a problem of unsatisfactory use when the trigger switch is unlocked by a thumb.

The disclosure provides a handheld power tool, the handheld power tool includes a housing assembly, a handle assembly and a switch assembly. The handle assembly is arranged on the housing assembly and the switch assembly is arranged on the handle assembly. The switch assembly includes a button assembly and a push-pull assembly. The button assembly is arranged on the housing assembly and the push-pull assembly is slidably connected with the handle assembly.

Wherein, when the push-pull assembly is configured to complete at least two actions, a first action and a second action, the button assembly is unlocked, the first action is to slide back and forth along the handle assembly, and the second action is to slide back and forth obliquely along the handle assembly.

In some embodiments, the push-pull assembly includes a pushing rod, a limiting handle and a spring. The pushing rod is mounted on the handle assembly. The limiting handle is connected with the pushing rod and forming an angle with the pushing rod. The spring is mounted in the handle assembly and connected with one end of the pushing rod.

In some embodiments, after the pushing rod completes at least two actions, the limiting handle is located in a cavity of a trigger switch in the switch assembly.

In some embodiments, the handheld power tool further includes a hook assembly, the hook assembly is arranged on the housing assembly, the hook assembly is configured to connect or disconnect a tool buckle with the handheld power tool, the tool buckle is connected with an operator of the handheld power tool.

In some embodiments, the hook assembly includes a side hook and a bottom hook, the side hook and the bottom hook are pivotally connected with the housing assembly, and pivot axes of the side hook and the bottom hook are substantially perpendicular to each other in space.

In some embodiments, the side hook includes a side operating component, a first connecting component and a second connecting component. The first connecting component is connected with a first end of the side operating component. The second connecting component, connected with a second end of the side operating component. Wherein, the first connecting component and the second connecting component can be elastically deformed relative to the operating component.

In some embodiments, the side hook further includes a first side rotating shaft and a second side shaft. The first side rotating shaft is connected with the first connecting component, and pivotally connected in a side housing groove of the housing assembly. The second side shaft is connected with the second connecting component and pivotally connected in the side housing groove. Wherein, when the first connecting component and the second connecting component are elastically deformed, a distance between the first side rotating shaft and the second side rotating shaft is variable.

In some embodiments, the bottom hook includes a first leg, a second leg and a bottom operating component. The first leg is a first bottom rotating shaft being formed on the first leg. The second leg is a second bottom rotating shaft being formed on the second leg. The bottom operating component, connecting the first leg with the second leg. Wherein, the bottom operating component and at least part of the first leg and at least the second leg are located on a first plane, the first bottom rotating shaft, the second bottom rotating shaft and at least part of the first leg and at least the second leg are located in a second plane, and the first plane intersects the second plane.

In some embodiments, the first leg includes a first front leg and a first rear leg, the second leg includes a second front leg and a second rear leg, the first front leg and the second front leg are located in the first plane, and the first rear leg and the second rear leg are located in the second plane.

In some embodiments, the bottom operating component contacts a rotating component of the tool buckle, so that the handheld power tool is connected with the tool buckle, and the first leg or the second leg contacts the rotating component, and the handheld power tool is disengaged from the tool buckle.

In some embodiments, the handheld power tool further includes a battery assembly, the battery assembly and the housing assembly are two separate parts, and the battery assembly includes a battery holder, a battery pack and a power cable. The battery pack is arranged in the battery holder, configured to provide energy to electrical components in the housing assembly. The power cable is connected between the battery pack and the housing assembly.

In some embodiments, the handheld power tool further includes a heat dissipation assembly, the heat dissipation assembly further includes an air guiding ring, a heat dissipation device, an air inlet and an air outlet. The air guiding ring is arranged on a driving motor, and an air passage is formed between the air guiding ring and the housing assembly. The heat dissipation device is arranged in the housing assembly and located in the air passage. The air inlet communicates with the air passage and arranged on a side of the housing assembly. The air outlet communicates with the air passage and arranged on a bottom surface of the housing assembly.

In some embodiments, the handheld power tool further includes a protection assembly, the protection assembly includes a protection cover, a first end of the protection cover is connected with the housing assembly, and a cover part is formed on a second end of the protection cover, the cover part covers a power port of the housing assembly, and fits with the housing assembly around the power port to form a sealing surface.

In some embodiments, the cover part includes an embedding part and a fitting part. The embedding part is embedded in the power port. The fitting part is arranged outside the embedding part, and closely attached to the housing assembly around the power port.

In some embodiments, the handheld power tool further includes a hanging ring assembly, which is used to organize the power cable. The hanging ring assembly includes a hanging body, a first fixing body and a second fixing body. The hanging body is provided with a first opening. The first fixing body is arranged on a first end of the hanging body. The second fixing body is arranged on a second end of the hanging body. Wherein, a second opening is formed between the first fixing body and the second fixing body.

In some embodiments, the first fixing body and the second fixing body can be elastically deformed relative to the hanging body.

In some embodiments, a first gap is formed between the first fixing body and the second fixing body, and when the first fixing body and the second fixing body deform elastically, the first gap is variable.

In some embodiments, the first opening communicates or not communicate with the second opening.

In some embodiments, when the first opening does not communicate with the second opening, a second gap is formed between one end of the first fixing body and one end of the second fixing body, and a width of the second gap is smaller than an inner diameter of the second opening, and the width of the second gap is smaller than an outer diameter of the power cable.

As mentioned above, the disclosure provides a handheld power tool, the pushing rod penetrates through the main handle, and to start the push-pull assembly, it is only needs to push the pushing rod forward and press down to unlock the switch trigger through the palm of the hand. A running track of the pushing rod is to move forward and slide along the main handle first, and then move downward along a slope of the main handle or the guiding rib. This process may be completed under a thrust of the palm, which can improve a problem of unsatisfactory comfort when using the thumb to unlock the trigger switch. At the same time, the hook assembly and the hanging ring assembly are provided, the operator may hang the power tool on the body through the hook assembly, and store and organize the power cable through the hanging ring assembly, which can improve a convenience of using the power tool.

BRIEF DESCRIPTION OF THE DRAWINGS

In order to explain technical solutions of embodiments of the disclosure more clearly, the following will briefly introduce drawings used in a description of the embodiments or the conventional art. Obviously, the drawings in the following description are only some embodiments of the disclosure. For those of ordinary skill in the art, other drawings may be obtained based on these drawings without creative work.

PART NUMBER DESCRIPTION

Figure 1:
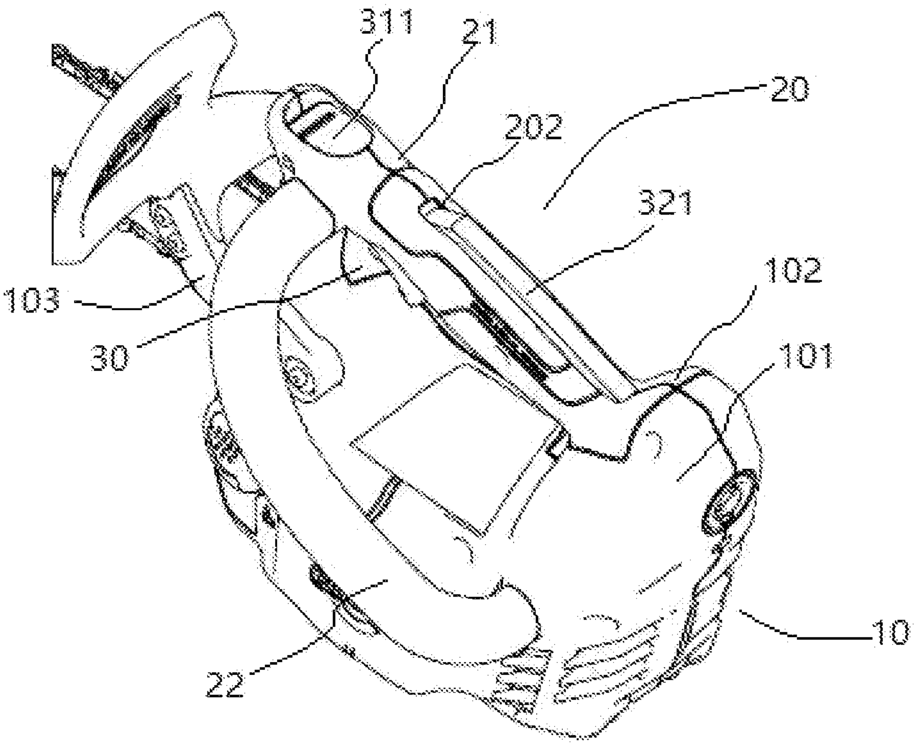
FIG. 1 is a partial schematic structural view of a handheld power tool in an embodiment of the disclosure.

10—housing assembly; 101—first housing; 102—second housing; 103—protection housing;

20—handle assembly; 21—main handle; 22—auxiliary handle; 201—trigger mounting groove; 202—pushing rod mounting groove; 203—stripe groove; 204—main sliding limiting groove; 2041—first groove; 2042—second groove; 205—auxiliary sliding limiting groove;

30—switch assembly; 31—button assembly; 311—power-on switch; 312—trigger switch; 313—limiting switch; 32—push-pull assembly; 321—pushing rod; 3211—main sliding supporting block; 3212—auxiliary sliding supporting block; 322—limiting handle; 323—spring mounting base; 324—spring;

40—saw assembly; 41—saw plate; 42—sprocket; 43—chain; 44—tensioner; 451—braking handle; 452—braking steel belt; 461—oil pot; 462—oil pump; 47—driving motor;

50—heat dissipation assembly; 51—air inlet; 52—air outlet; 53—controller; 54—air guiding ring;

60—battery assembly; 61—power cable; 62—battery holder; 63—battery pack; 64—power supply port; 65—power port;

70—protection assembly; 71—protection cover; 711—cover part; 7111—fitting part; 7112—embedding part; 72—port mounting hole; 73—mounting belt; 74—buckle; 75—protection mounting hole; 76—annular groove;

80—hook assembly; 81—side hook; 811—first side rotating shaft; 812—second side rotating shaft; 813—first connecting component; 814—second connecting component; 815—side operating component; 82—side housing groove; 83—side protruding limiting groove; 84—side housing limiting groove; 85—side operating groove; 86—bottom hook; 861—first bottom rotating shaft; 862—second bottom rotating shaft; 863—first leg; 8631—first front leg; 8632—first rear leg; 864—second leg; 8641—second front leg; 8642—second rear leg; 865—bottom operating component; 871—bottom housing groove; 872—bottom protruding limiting groove; 873—bottom housing limiting groove; 874—limiting block; 88—tool buckle; 881—hook body; 882—rotating component;

90—hanging ring assembly; 91—hanging body; 92—first fixing body; 93—second fixing body; 94—first opening; 95—second opening; 96—limiting hook; 97—safety rope; 98—first gap; 99—second gap.

DETAILED DESCRIPTION

Technical solutions in embodiments of the disclosure will be clearly and completely described below in conjunction with accompanying drawings in the embodiments of the disclosure. Obviously, the described embodiments are only some of the embodiments of the disclosure, not all of them. All other embodiments obtained by persons of ordinary skill in the art based on the embodiments in the disclosure without creative efforts fall within a protection scope of the disclosure.

Please refer to FIG. 1 through FIG. 42. The disclosure provides a handheld power tool. The handheld power tool may be a chain saw, or a cutting saw, a hedge trimmer, and the like. The handheld power tool may include a housing assembly 10, a handle assembly 20, a switch assembly 30, a saw assembly 40, a heat dissipation assembly 50, a battery assembly 60, a protection assembly 70, a hook assembly 80 and a hanging ring assembly 90. Wherein, the housing assembly 10 may be provided with the saw assembly 40 and a driving assembly, and the driving assembly may drive the saw assembly 40 to cut. The housing assembly 10 may be provided with the handle assembly 20 through which the operator may operate the handheld power tool. The switch assembly 30 may be used to control the driving assembly to work, and the switch assembly 30 may be arranged on the housing assembly 10 and the handle assembly 20. The heat dissipation assembly 50 may be arranged in the housing assembly 10 to dissipate heat inside the housing assembly 10. The battery assembly 60 may provide power for the handheld power tool through a power cable 61. The protection assembly 70 may be mounted on one side of the housing assembly 10 to protect electrical components inside the housing assembly 10. The hook assembly 80 may be mounted on one side of the housing assembly 10 and the handheld power tool may be hung on the operator through the hook assembly 80. The hanging ring assembly 90 may be arranged on one side of the housing assembly 10 and the power cable 61 of the handheld power tool may be organized through the hanging ring assembly 90.

Please refer to FIG. 1 through FIG. 12. In an embodiment of the disclosure, the housing assembly 10 may include a first housing 101, a second housing 102 and a protection housing 103. A housing cavity is formed between the first housing 101 and the second housing 102, and the driving assembly may be located in the housing cavity. A side wall of the second housing 102 may be provided with a mounting groove depressed inwardly, the protection housing 103 may be mounted on the mounting groove, a part of the saw assembly 40 may be located in the mounting groove, the other part of the saw assembly 40 may pass through the mounting groove and be located outside the second housing 102 and the protective housing 103, and the protection housing 103 may protect an internal part of the saw assembly 40.

Please refer to FIG. 1 through FIG. 10. In an embodiment of the disclosure, the handle assembly 20 may include a main handle 21 and an auxiliary handle 22. The main handle 21 may be arranged on the housing assembly 10, an opening may be formed between the main handle 21 and the housing assembly 10, and an operator's palm may pass through the opening to operate the main handle 21. The auxiliary handle 22 may be connected with a side surface of the first housing 101, a first end of the auxiliary handle 22 may be connected with a front end of the main handle 21, and a second end of the auxiliary handle 22 may be connected with one end of a side surface of the first housing 101 away from the saw assembly 40. The auxiliary handle 22 may also be arranged on a side surface of the second housing 102, and a specific connection position of the auxiliary handle 22 may be determined according to actual needs, as long as the auxiliary handle 22 can be arranged obliquely on the housing assembly 10. The main handle 21 and the housing assembly 10 may be integrally formed, the auxiliary handle 22 and the housing assembly 10 may also be integrally formed, and the auxiliary handle 22 and the main handle 21 may also be integrally formed. Wherein, an axis of the auxiliary handle 22 may be defined as L1, a midline in a length direction of the saw assembly 40 may be defined as L2, a vertical line of the housing assembly 10 may be defined as L3, and an angle between the axis L1 and the midline L2 may be less than 90°, and a center of gravity of the handheld power tool is on the vertical line L3.

Figure 2:
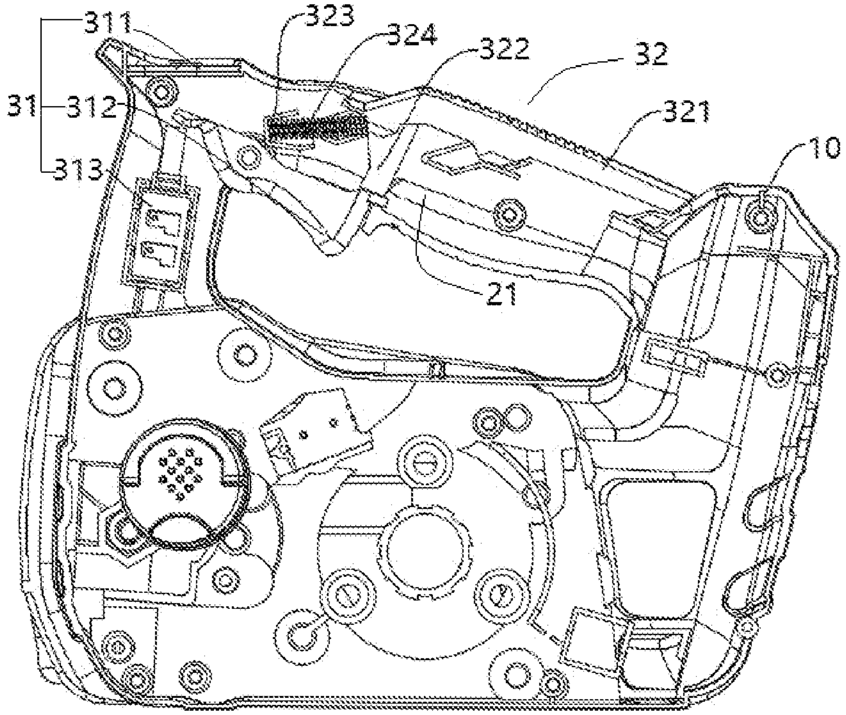
FIG. 2 is a schematic structural view of a switch assembly in the handheld power tool according to an embodiment of the disclosure.

Please refer to FIG. 1 and FIG. 2. In an embodiment of the disclosure, the switch assembly 30 may include a button assembly 31 and a push-pull assembly 32, the operator may control the push-pull assembly 32 to control a start and stop of the button assembly 31, so as to control a working state of the driving assembly. The push-pull assembly 32 may be arranged on the main handle 21, and the operator may control a forward and backward movement of the push-pull assembly 32 with only one hand, so as to control the start and stop of the button assembly 31.

Figure 4:
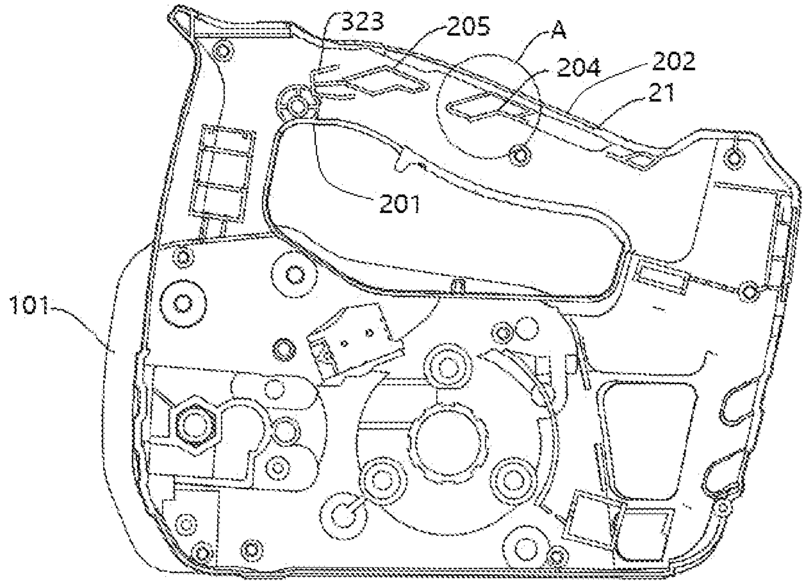
FIG. 4 is a schematic view of an internal structure of a housing assembly of the handheld power tool in an embodiment of the disclosure.
Figure 5:
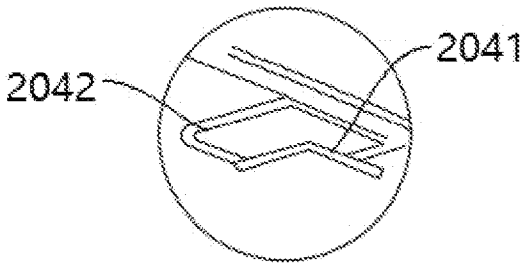
FIG. 5 is a schematic structural view of an enlarged structure of part A in FIG. 4.
Figure 6:
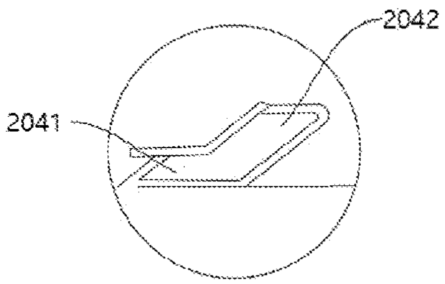
FIG. 6 is another schematic structural view of the enlarged structure of part A in FIG. 4.

Please refer to FIG. 2 and FIG. 4. In an embodiment of the disclosure, the button assembly 31 may include a power-on switch 311, a trigger switch 312 and a limiting switch 313. Wherein, only when the power-on switch 311 and the limiting switch 313 are both in an activated state, the handheld power tool can be allowed to start. Specifically, the power-on switch 311 may adopt a membrane panel switch, the handheld power tool may be initially powered on through the membrane panel switch, and a specific type of the power-on switch 311 may be determined according to actual needs. The trigger switch 312 may be used to trigger the limiting switch 313, and the limiting switch 313 is connected with a control circuit of the handheld power tool. When the limiting switch 313 is triggered, the handheld power tool is started. In order to trigger the limiting switch 313 conveniently, a trigger mounting groove 201 may be arranged at a bottom of the main handle 21, the trigger switch 312 may be mounted in the trigger mounting groove 201, and the trigger switch 312 is pivotally connected on the main handle 21, therefore, during a process of pivoting the trigger switch 312, the trigger switch 312 triggers the limiting switch 313, so that the handheld power tool is started.

Please refer to FIG. 1 and FIG. 2. In an embodiment of the disclosure, the push-pull assembly 32 may be movably mounted on the main handle 21, and the push-pull assembly 32 may be arranged on a top of the main handle 21 or on a side surface of the main handle 21. The push-pull assembly 32 may be used to limit a movement of the trigger switch 312 to prevent the driven trigger switch 312 from accidentally triggering the handheld power tool. When the push-pull assembly 32 acts on the trigger switch 312, the trigger switch 312 is not allowed to pivot relative to the main handle 21. Conversely, when the push-pull assembly 32 is not acting on the trigger switch 312, the trigger switch 312 is allowed to pivot relative to the main handle 21.

Figure 3:
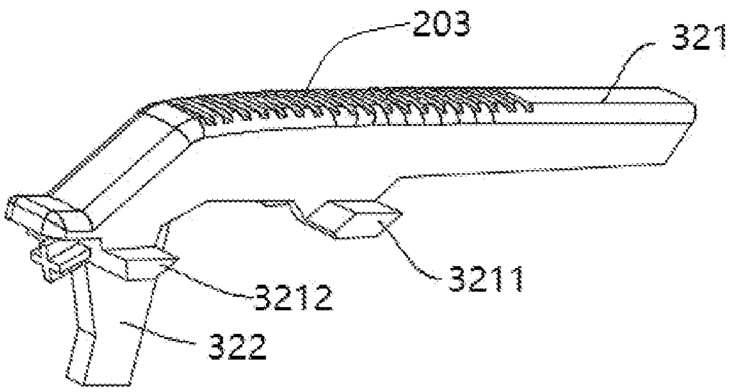
FIG. 3 is a schematic structural view of a push-pull assembly in the handheld power tool according to an embodiment of the disclosure.

Please refer to FIG. 2, FIG. 3 and FIG. 4. In an embodiment of the disclosure, the push-pull assembly 32 may include a pushing rod 321, a limiting handle 322, a spring mounting base 323 and a spring 324. Wherein, the main handle 21 may be provided with a pushing rod mounting groove 202, and the pushing rod 321 may be movably arranged in the pushing rod mounting groove 202. The pushing rod 321 may be connected with the limiting handle 322, an angle is formed between the pushing rod 321 and the limiting handle 322, the angle may range from 60° to 120°, may be 60°, 90°, or 120°, and the limiting handle 322 may be located on one end of the pushing rod 321 close to the limiting switch 313. The spring mounting base 323 may be arranged inside the main handle 21, the spring 324 may be arranged in the spring mounting base 323, and the spring 324 may be connected with the pushing rod 321. Therefore, when the pushing rod 321 is pushed, the spring 324 will be compressed, and when the pushing rod 321 is released, the spring 324 will reset, which drives the pushing rod 321 to return to an initial position. In order to facilitate the operator to push the pushing rod 321, a plurality of stripe grooves 203 may be arranged on a surface of the pushing rod 321 to increase a friction force between the pushing rod 321 and operator's hand.

Please refer to FIG. 2 and FIG. 3. In an embodiment of the disclosure, when the pushing rod 321 moves, it will drive the limiting handle 322 to move synchronously. In order to limit the trigger switch 312 through the limiting handle 322, the trigger switch 312 may be configured as a hollow structure with a cavity inside. When the pushing rod 321 is not pushed or the pushing rod 321 is not pushed to a predetermined position, the limiting handle 322 is in contact with a tail of the trigger switch 312. At this time, the trigger switch 312 is blocked by the limiting handle 322 and could not rotate. The limiting handle 322 may limit the trigger switch 312. When the operator pushes the pushing rod 321 to the predetermined position, the limiting handle 322 may move into the cavity of the trigger switch 312, then the trigger switch 312 is unlocked, and the operator may press the trigger switch 312 to drive the handheld power tool to start. During a use of the handheld power tool, the push-pull assembly 32 is always in an unlocked state. When the palm does not leave a holding area of the main handle 21, which means that when the push-pull assembly 32 is always in the unlocked state, even if the limiting switch 313 stops, as long as the trigger switch 312 is pressed again within a predetermined time, the handheld power tool may be restarted, and the predetermined time may be one minute. A starting sequence of the handheld power tool is: press the power-on switch 311 to power on the handheld power tool, push the pushing rod 321, so as to enable the limiting handle 322 to move into the cavity of the trigger switch 312, and then press the trigger switch 312. The trigger switch 312 triggers the limiting switch 313 to conduct, and at this time the power-on switch 311 and the limiting switch 313 are both triggered, so that the handheld power tool starts to work. When the operator releases the pushing rod 321, the pushing rod 321 returns to an original state under an action of the spring 324. At this time, the limiting handle 322 returns to an initial position, and the trigger switch 312 returns to the initial position, so that the trigger switch 312 and the limiting switch 313 do not contact with each other, thereby the handheld power tool is powered off and stops working after a predetermined time. Of course, in other embodiments, the power-on switch 311 may not be arranged, and a work of the handheld power tool may be controlled only by the limiting switch 313. In order to prevent the handheld power tool from being activated due to an accidental touch of the pushing rod 321, the push-pull assembly 32 may be configured such that the trigger switch 312 is unlocked after at least two actions are completed. The first action may be that the pushing rod 321 slides back and forth along the main handle 21, which is characterized as moving in a first direction, and the second action may be that the pushing rod 321 slides obliquely forward and backward along the main handle 21, which is represented as moving in a second direction. The first direction may be substantially parallel to a direction of the main handle 21, and the second direction may form a certain angle with the direction of the main handle 21.

Please refer to FIG. 3 and FIG. 4. In an embodiment of the disclosure, in order to prevent the pushing rod 321 from being deflected during an activity, two symmetrical main sliding supporting blocks 3211 may be arranged on both sides of the pushing rod 321, and two symmetrical auxiliary sliding supporting blocks 3211 may also be arranged on both sides of the pushing rod 321. The two main sliding supporting blocks 3211 may be slidably arranged in two main sliding limiting grooves 204 respectively, and the two auxiliary sliding supporting blocks 3212 may be slidably arranged in two auxiliary sliding limiting grooves 205 respectively. The main sliding limiting groove 204 and the auxiliary sliding limiting groove 205 may be arranged correspondingly on the main handle 21. A matching of the main sliding supporting block 3211 and the main sliding limiting groove 204 and a matching of the auxiliary sliding supporting block 3212 and the auxiliary sliding limiting groove 205 may play a guiding role in a movement of the pushing rod 321, which prevents the pushing rod 321 from being deflected during the activity. Of course, structures of the main sliding supporting block 3211 and the auxiliary sliding supporting block 3212 may be similar, and structures of the main sliding limiting groove 204 and the auxiliary sliding limiting groove 205 may also be similar.

Please refer to FIG. 2, FIG. 4, FIG. 5 and FIG. 6. In an embodiment of the disclosure, when a structure of the main sliding limiting groove 204 is similar to a structure of the auxiliary sliding limiting groove 205, the main sliding limiting groove 204 is taken as an example for illustration. The main sliding limiting groove 204 may include a first groove 2041 and a second groove 2042, a certain angle may be formed between the first groove 2041 and the second groove 2042, and the angle may be greater than 90°, so as to ensure a smooth sliding of the main sliding supporting block 3211 in the main sliding limiting groove 204. In this embodiment, a direction of the first groove 2041 is substantially parallel to a direction of the pushing rod 321, the second groove 2042 may be located at a first end of the first groove 2041, and the first groove 2041 is close to the limiting switch 313. The second groove 2042 is arranged along a direction from a top of the main handle 21 toward a bottom of the main handle 21. The push-pull assembly 32 may be arranged on a back of the holding area of the main handle 21 through penetrating the holding area. When the operator activates the push-pull assembly 32, it only needs to give the push-pull assembly 32 a forward pushing force with his palm and a pressing force by palm gripping to unlock the trigger switch 312. Specifically, under a pushing action of the palm, the pushing rod 321 is pushed forward, so that the pushing rod 321 first moves and slides forward along the first groove 2041, and then the main handle 21 is held tightly, so that the pushing rod 321 moves downward along the second groove 2042. In other embodiments, the direction of the first groove 2041 is substantially parallel to the direction of the pushing rod 321, and the second groove 2042 may be located at a second end of the first groove 2041. The second groove 2042 is arranged along the direction from the top of the main handle 21 toward the bottom of the main handle 21. When the operator activates the push-pull assembly 32, it only needs to give the push-pull assembly 32 a forward thrust with the palm of his hand and press down firmly to unlock the trigger switch 312. Specifically, under the action of the palm, the pushing rod 321 is held tightly, so that the pushing rod 321 first moves downward along the second groove 2042, then the pushing rod 321 is pushed forward, and the pushing rod 321 moves and slides along the first groove 2041. This process may be completed only by the palm of the hand, which means that the pushing rod 321 first completes a first action, and then completes a second action to realize an unlocking of the trigger switch 312. At this time, the trigger switch 312 may be triggered to activate the limiting switch 313, and the trigger switch 312 may transmit a start signal to the control circuit of the handheld power tool to start the handheld power tool. After the push-pull assembly 32 finishes the unlocking of the trigger switch 312, the pushing rod 321 is located in the main handle 21, so as to improve an operator's comfort.

Figure 9:
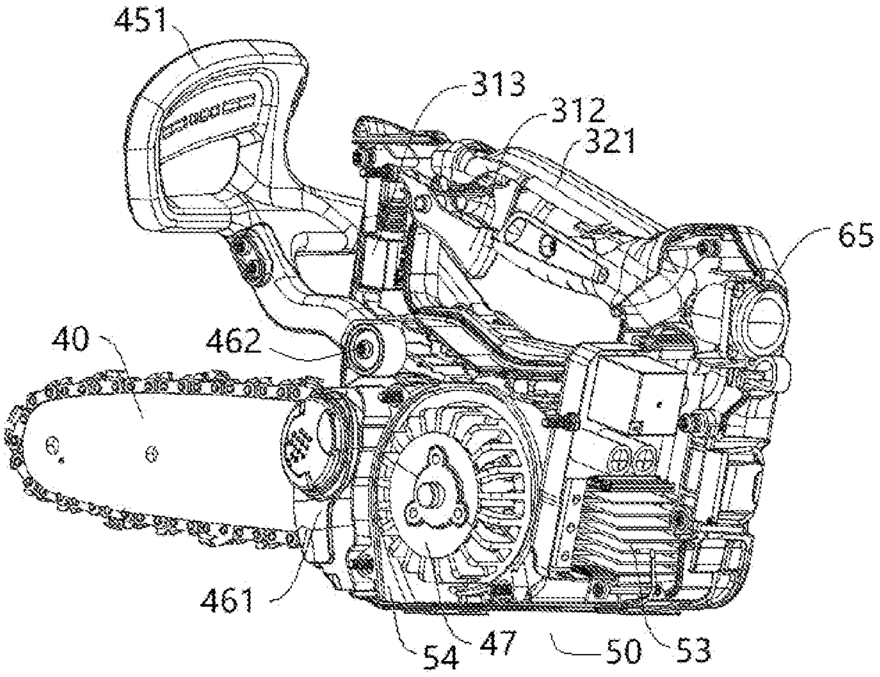
FIG. 9 is a schematic structural view of an internal structure of FIG. 8.
Figure 10:
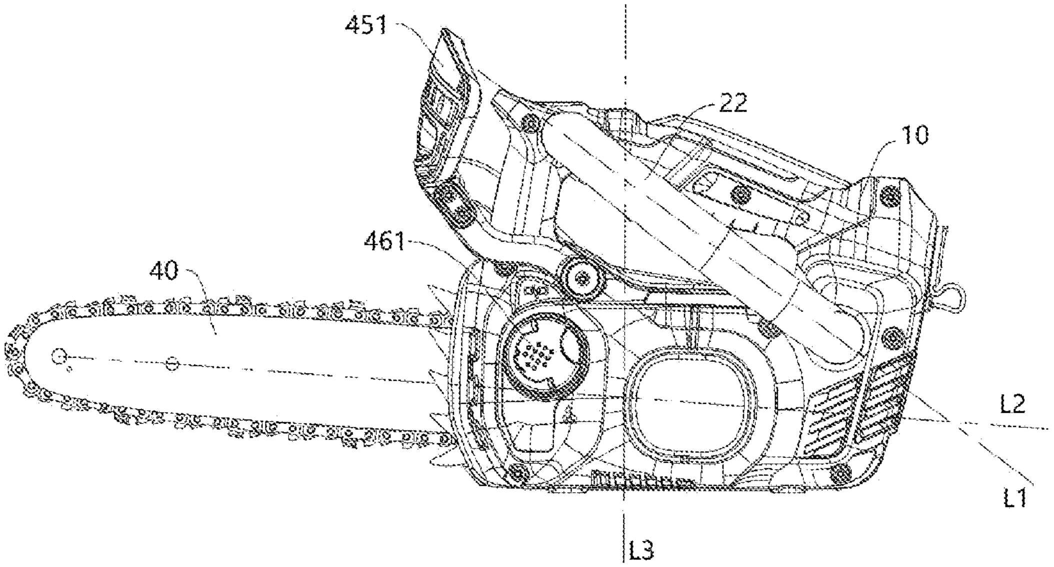
FIG. 10 is a front view of FIG. 8.
Figure 11:
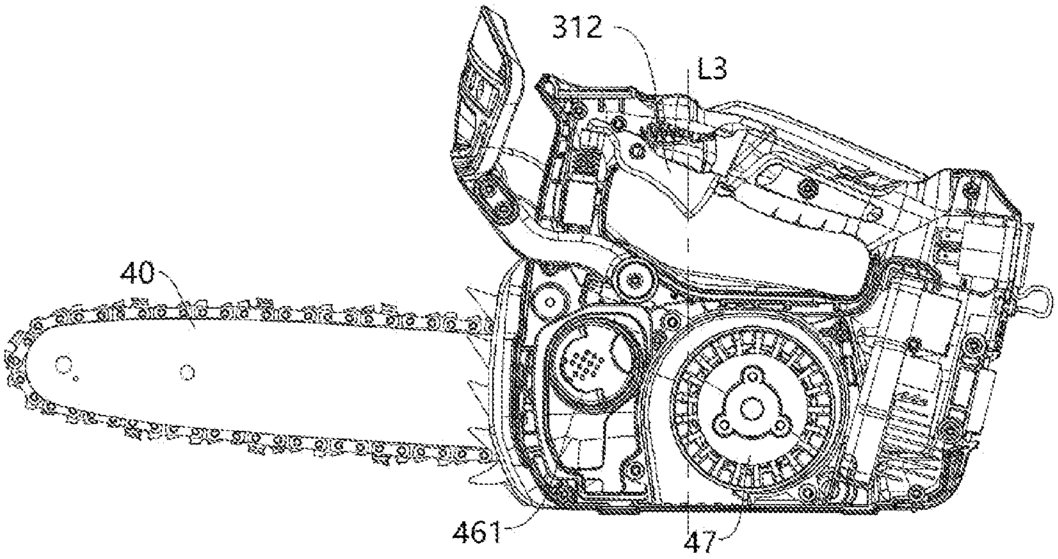
FIG. 11 is a schematic structural view of an internal structure of FIG. 10
Figure 12:
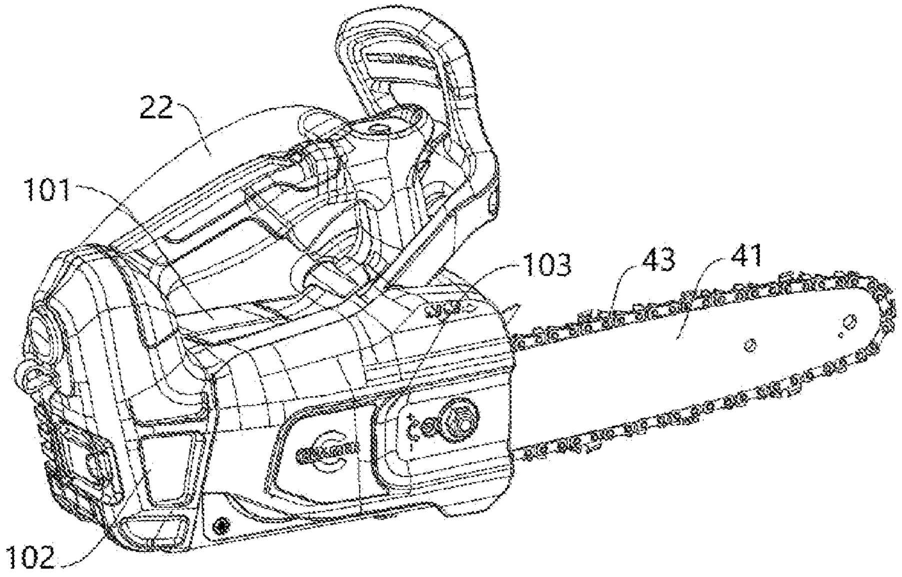
FIG. 12 is a schematic structural view of the handheld power tool from another angle in an embodiment of the disclosure.
Figure 13:
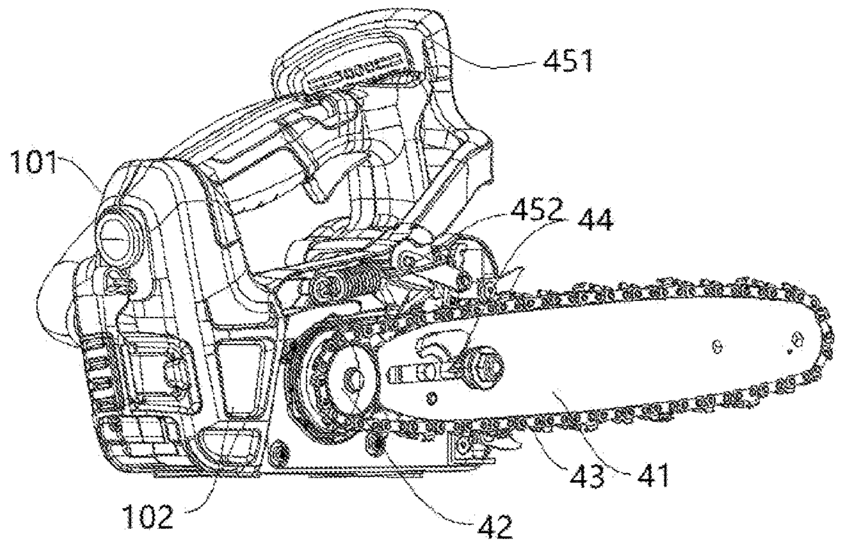
FIG. 13 is a schematic structural view of an internal structure of FIG. 12.

Please refer to FIG. 9 and FIG. 13. In an embodiment of the disclosure, the saw assembly 40 may include a saw plate 41, a sprocket 42, a chain 43 and a tensioner 44. A transmission between the driving assembly and the chain 43 may be carried out through the sprocket 42, and the sprocket 42 may be rotatably mounted in the mounting groove which an inward depression on the second housing 102. One end of the saw plate 41 may be located in the mounting groove, and connected with the housing assembly 10 through the tensioner 44. The tensioner 44 may be mounted on the second housing 102, and a tightness of the chain 43 may be adjusted through the tensioner 44. The sprocket 42 may include a sprocket plate and sprocket teeth, and the sprocket teeth may be fixedly connected with one side of the sprocket plate. The chain 43 may be arranged along a circumferential direction of the saw plate 41 and is meshed with the sprocket teeth for transmission. Specifically, the saw plate 41 is provided with a positioning groove along its circumference, and transmission teeth on the chain 43 are located in the positioning groove. When the driving assembly drives the sprocket 42 to rotate, the chain 43 moves along the positioning groove to complete a cutting. The driving assembly may be a driving motor 47. In this embodiment, in order to realize a braking of the sprocket 42, a braking handle 451 may be arranged on a front end of the housing assembly 10, and the braking handle 451 may control a braking steel belt 452 to work. An outer surface circumference of the sprocket plate is provided with multiple depression grooves, and the braking steel belt 452 may be arranged around the depression grooves. When the braking handle 451 is pulled, the braking steel belt 452 is tightened to drive the sprocket 42 to stops rotating.

Please refer to FIG. 9 and FIG. 13. In an embodiment of the disclosure, in order to lubricate the saw plate 41, an oil pot 461 and an oil pump 462 may also be mounted in the housing assembly 10, lubricating oil may be stored in the oil pot 461, the oil pot 461 may communicate with the oil pump 462 through an oil inlet, an oil outlet of the oil pump 462 may communicate with a saw plate hole on the saw plate 41, and the saw plate hole may be communicated with the positioning groove of the saw plate 41. The lubricating oil may be pumped into the positioning groove of the saw plate 41 by the oil pump 462, and when the driving motor 47 drives the chain 43 to move, the lubricating oil may lubricate the chain 43. Wherein, a center of gravity of the handheld power tool may be between the oil pot 461 and the driving motor 47, and be located on the vertical line L3.

Figure 8:
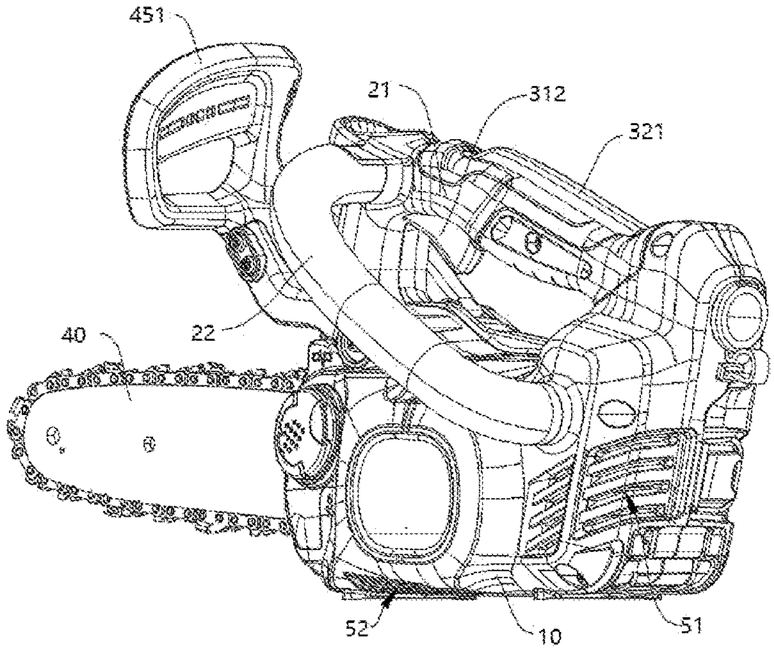
FIG. 8 is a schematic structural view of the handheld power tool in an embodiment of the disclosure.

Please refer to FIG. 8 and FIG. 9. In an embodiment of the disclosure, since the driving motor 47 will inevitably generate a certain amount of heat during a working process of the handheld power tool, which results in a higher internal temperature of the housing assembly 10. In order to dissipate heat from an inside of the housing assembly 10 in time, the housing assembly 10 may also be provided with a heat dissipation assembly 50. The heat dissipation assembly 50 may include a heat dissipation device, an air guiding ring 54 and a controller 53. Wherein, the air guiding ring 54 may be arranged on an outer ring of the driving motor 47, and an air passage may be formed between the air guiding ring 54 and the housing assembly 10. In order to allow hot air in the air passage to be discharged smoothly, an air inlet 51 and an air outlet 52 may be respectively arranged on the housing assembly 10. The air inlet 51 may be located on a side surface of a rear of the housing assembly 10, specifically, the air inlet 51 may be located on a left side of the rear of the housing assembly 10, and the air inlet 51 is inclined backward and downward. The air outlet 52 may be located at a bottom of the housing assembly 10. Specifically, the air outlet 52 may be located directly below the driving motor 47 in the housing assembly 10. The air outlet 52 is longitudinally and downwardly opened relative to the housing assembly 10. The air outlet 52 may communicate with the air passage. It should be noted that the heat dissipation device may be mounted in the housing assembly 10, and the heat dissipation device is facing the air inlet 51. In this embodiment, the control circuit mentioned above may be the controller 53, which may control an operation of the driving motor 47, and the controller 53 may be mounted on one side of the heat dissipation device. When an inside of the housing assembly 10 needs to be cooled, external cold air may enter the inside of the housing assembly 10 from the air inlet 51, and after passing through the heat dissipation device, the cold air enters the air passage to dissipate heat from the driving motor 47, and finally heat air is discharged from the air outlet 52.

Figure 7:
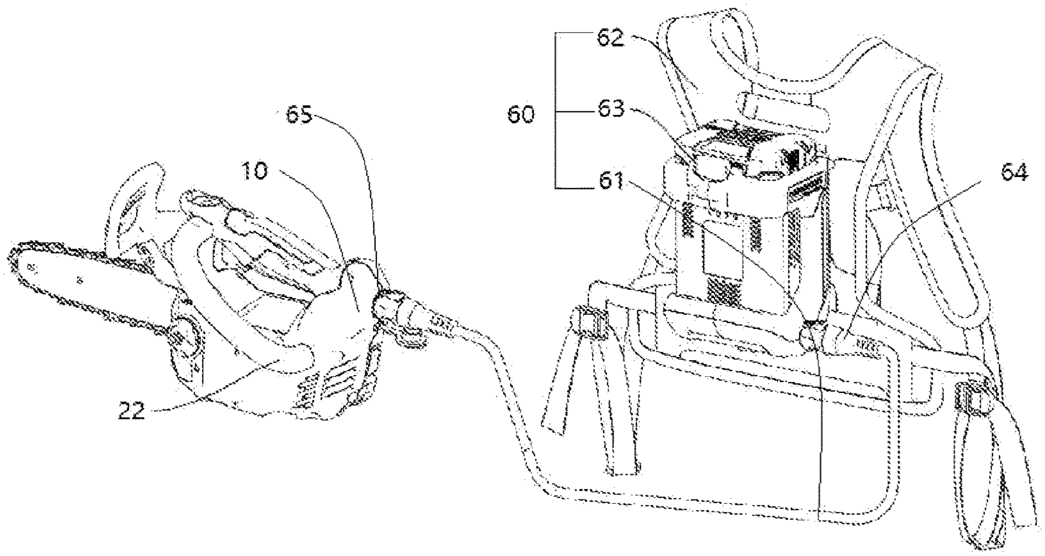
FIG. 7 is a schematic structural view of a matching of the housing assembly and the battery assembly in the handheld power tool in an embodiment of the disclosure.

Please refer to FIG. 7. In an embodiment of the disclosure, in order to improve an endurance capability of the driving motor 47, a battery assembly 60 may also be arranged on the handheld power tool, and the battery assembly 60 may be electrically connected with the driving motor 47 to provide energy for the driving motor 47. The battery assembly 60 and the housing assembly 10 are two separate parts, and the battery assembly 60 may include a power cable 61, a battery holder 62 and a battery pack 63. Wherein, the battery pack 63 may be mounted on the battery holder 62, the battery holder 62 may be configured as a backpack structure, and the operator may carry the battery holder 62 on his back. A power supply port 64 may be arranged on the battery holder 62, and the power supply port 64 may be electrically connected with the battery pack 63. A power port 65 may be arranged on the handle assembly 20, the power port 65 may be electrically connected with the driving motor 47, the controller 53, etc., and the power port 65 may be located on a tail side of the main handle 21. The power supply port 64 and the power port 65 may be electrically connected through the power cable 61, and the battery pack 63 may provide power to the electrical components inside the housing assembly 10.

Figure 14:
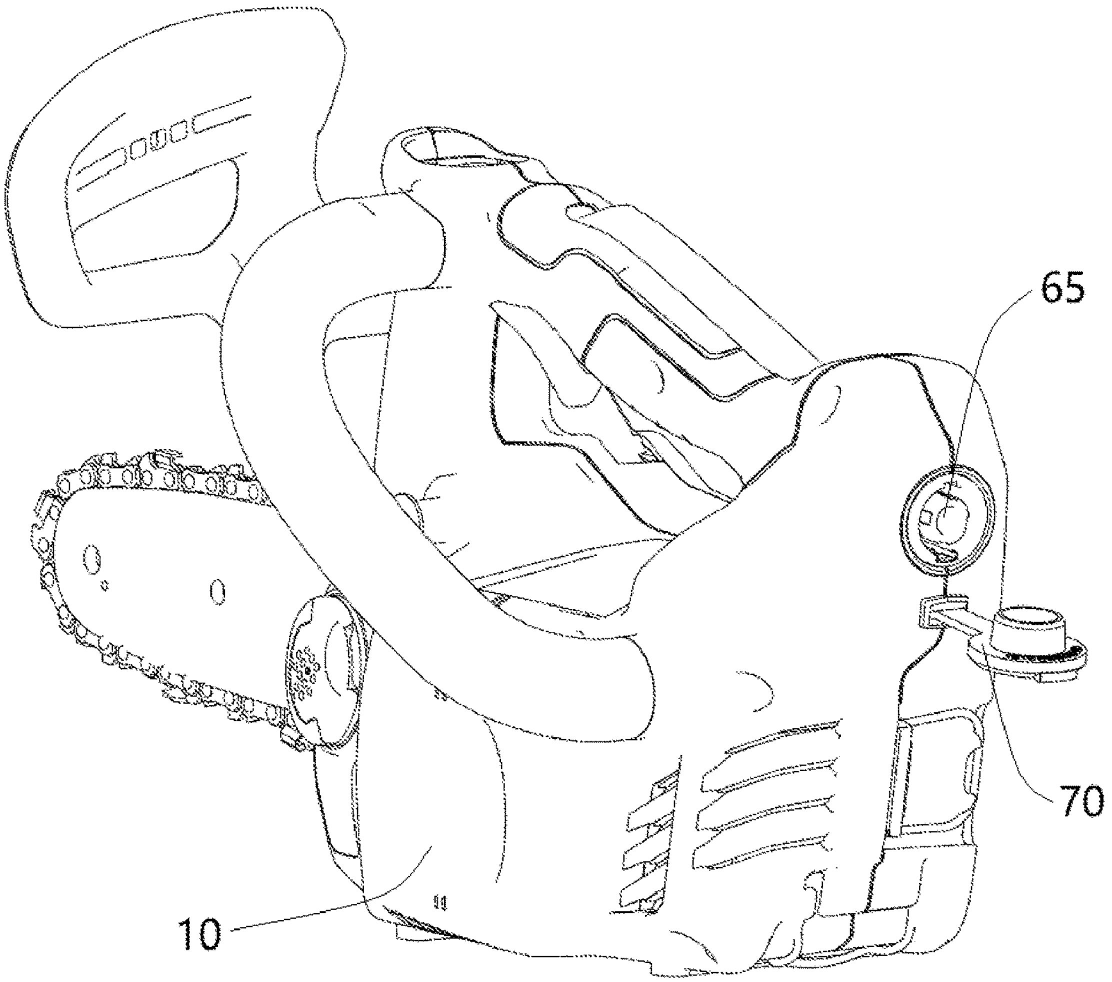
FIG. 14 is a schematic structural view of a protection assembly in the handheld power tool in an embodiment of the disclosure.
Figure 15:
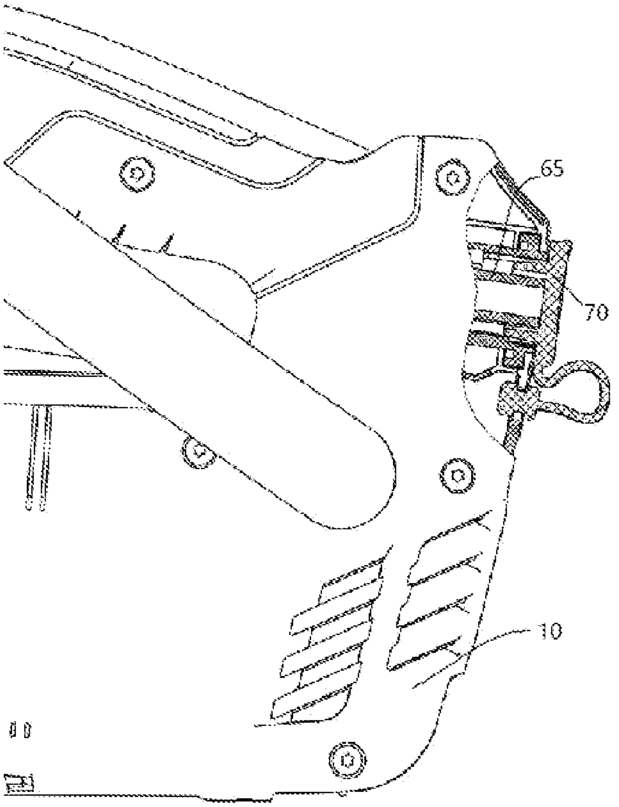
FIG. 15 is a schematic structural view of an internal structure of the protection assembly of the handheld power tool in an embodiment of the disclosure.
Figure 16:
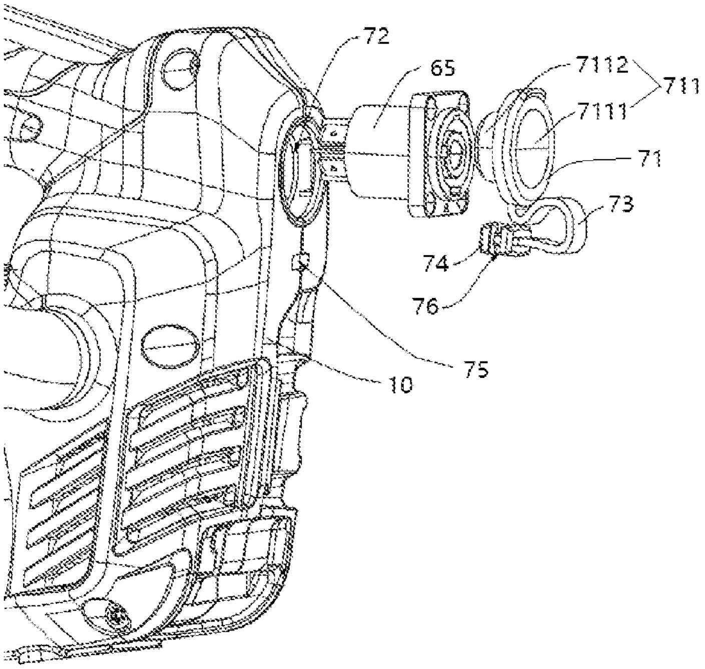
FIG. 16 is a schematic structural view of an exploded structure of a protection assembly in the handheld power tool according to an embodiment of the disclosure.

Please refer to FIG. 14, FIG. 15 and FIG. 16. In an embodiment of the disclosure, when the handheld power tool is not in use, the power port 65 is disconnected from the power cable 61, which causes the power port 65 to be directly exposed to the air. Moisture gas, dust and other impurities in the air may damage the structure of the power port 65. In order to protect the power port 65, a protection assembly 70 may also be arranged on the handheld power tool, and the power port 65 is protected by the protection assembly 70. Specifically, semicircular grooves may be provided at tails of the first housing 101 and the second housing 102, and when the first housing 101 and the second housing 102 are fixedly assembled, the two semicircular grooves may be combined to form a port mounting hole 72. And the power port 65 may be mounted in the port mounting hole 72 at this moment. The protection assembly 70 may be arranged on one side of the port mounting hole 72 to protect the power port 65.

Please refer to FIG. 15 and FIG. 16. In an embodiment of the disclosure, the protection assembly 70 may include a protection cover 71 and a mounting belt 73. Wherein, a first end of the protection cover 71 is connected with the housing assembly 10, and a second end of the protection cover 71 is formed with a cover part 711, the cover part 711 covers the power port 65, and fits with the housing assembly 10 around the power port 65 to form a sealing surface. Specifically, the cover part 711 may include a fitting part 7111 and an embedding part 7112, the embedding part 7112 may be embedded into the power port 65, the fitting part 7111 may be arranged outside the embedding part 7112, and an outer diameter of the fitting part 7111 is larger than an outer diameter of the power port 65. The fitting part 7111 may completely cover the power port 65, so that the fitting part 7111 is closely attached to a side of the housing assembly 10 outside the power port 65. Of course, in order to improve a sealing performance, an annular protruding structure may be arranged on the housing assembly 10 outside the port mounting hole 72, so that the fitting part 7111 may be better attached to the housing assembly 10.

Please refer to FIG. 16. In an embodiment of the disclosure, a first end of the mounting belt 73 may be connected with the housing assembly 10, and a second end of the mounting belt 73 may be connected with the protection cover 71. Specifically, a protection mounting hole 75 may be arranged at a tail of the housing assembly 10, and a buckle 74 is arranged on the first end of the mounting belt 73 connected with the housing assembly 10. The buckle 74 may be mounted in the protection mounting hole 75, the buckle 74 and the protection mounting hole 75 are both configured as rectangular buckles, and a middle part of the rectangular buckle may be provided with an annular groove 76, which may fix the buckle 74 in the protection mounting hole 75 and can prevent the protection cover 71 from freely rotating on the housing assembly 10 that affects the operation. It should be noted that, in this embodiment, the mounting belt 73 may be a flexible structure, which means that the mounting belt 73 may be bent.

Figure 17:
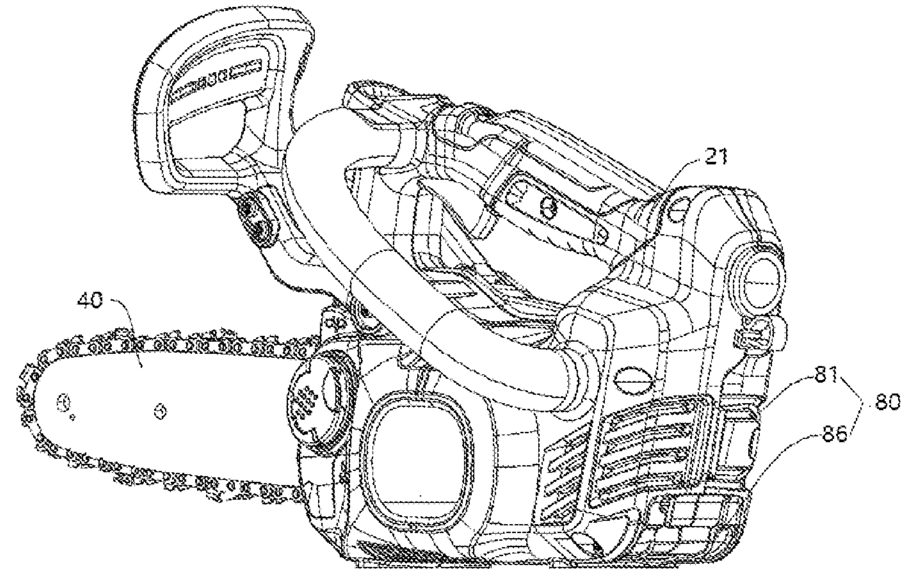
FIG. 17 is a schematic structural view of a hook assembly in the handheld power tool according to an embodiment of the disclosure.
Figure 18:
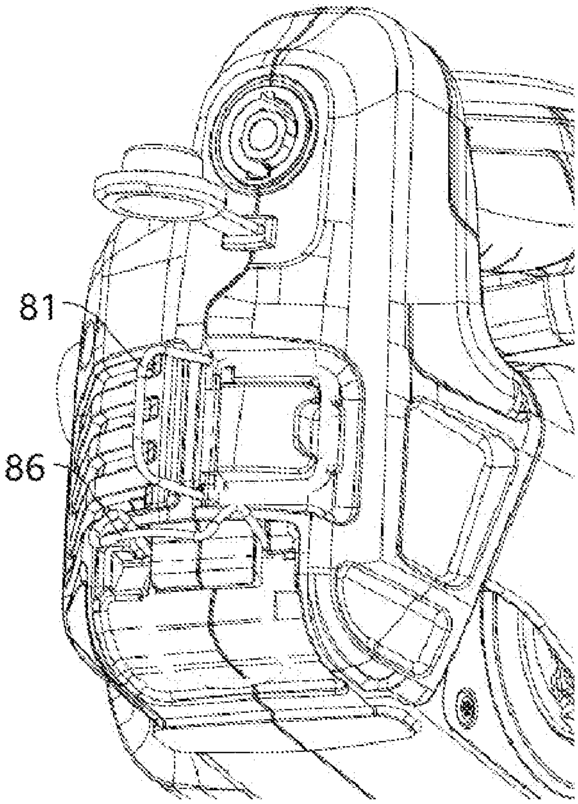
FIG. 18 is a structural schematic view of the hook assembly in the handheld power tool from another angle according to an embodiment of the disclosure.

Please refer to FIG. 17 and FIG. 18. In an embodiment of the disclosure, when the operator uses the handheld power tool, the operator may need to cut branches at different heights of a tree. When the operator moves a position, it is not convenient to hold the handheld power tool with both hands, but the handheld power tool must be carried with him, so as to be used at any time, so a hook assembly 80 may be arranged on the handheld power tool, so that the handheld power tool can be hung on the operator through the hook assembly 80 at any time. The hook assembly 80 may include a side hook 81 and a bottom hook 86. The side hook 81 and the bottom hook 86 may be mounted at the tail of the housing assembly 10. Specifically, the side hook 81 may be located in a middle position near the tail of the housing assembly 10. The bottom hook 86 may be located at a bottom position near the tail of housing assembly 10. The side hook 81 and the bottom hook 86 are pivotally connected with the housing assembly 10, and pivot axes of the side hook 81 and the bottom hook 86 are substantially perpendicular to each other in space. It should be noted that, since a transition surface between the tail of the housing assembly 10 and a bottom surface is arc-shaped, therefore, the bottom hook 86 may be configured to a same arc-shaped structure to match the transition surface between the tail of the housing assembly 10 and the bottom surface. Both the side hook 81 and the bottom hook 86 are rotatably mounted together with the housing assembly 10, and the bottom hook 86 may be located below the side hook 81. The housing assembly 10 is provided with a protruding position and a storage position for mounting the side hook 81, and the housing assembly 10 is also provided with a protruding position and a storage position for mounting the bottom hook 86.

Please refer to FIG. 19, FIG. 20, FIG. 21 and FIG. 22. In an embodiment of the disclosure, when the side hook 81 is in a storage state and/or a protruding state, the side hook 81 may be located in the side housing groove 82, and the side housing groove 82 may be arranged in the middle position of the tail of the housing assembly 10. The operator may operate the side hook 81 to place it in different positions, so that the side hook 81 is in different working states. The side hook 81 may include a first side rotating shaft 811, a second side rotating shaft 812, a first connecting component 813, a second connecting component 814 and a side operating component 815, wherein the first side rotating shaft 811, the first connecting component 813, the side operating component 815, the second connecting component 814 and the second side rotating shaft 812 may be sequentially connected to form an approximately frame-shaped structure, which constitutes the side hook 81. In this embodiment, a required shape of the side hook 81 may be achieved by sequentially bending a long rod, or the side hook 81 may also be produced by integral molding.

Figure 19:
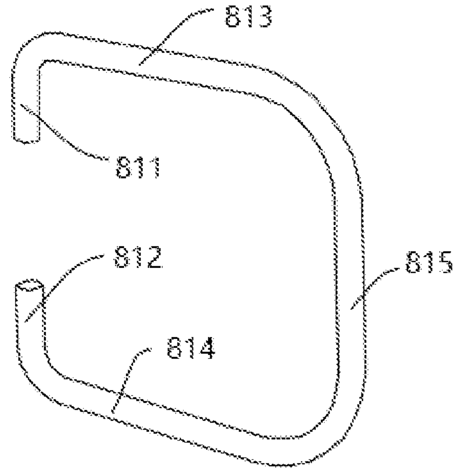
FIG. 19 is a schematic structural view of a side hook of the hook assembly in the handheld power tool according to an embodiment of the disclosure.
Figure 20:
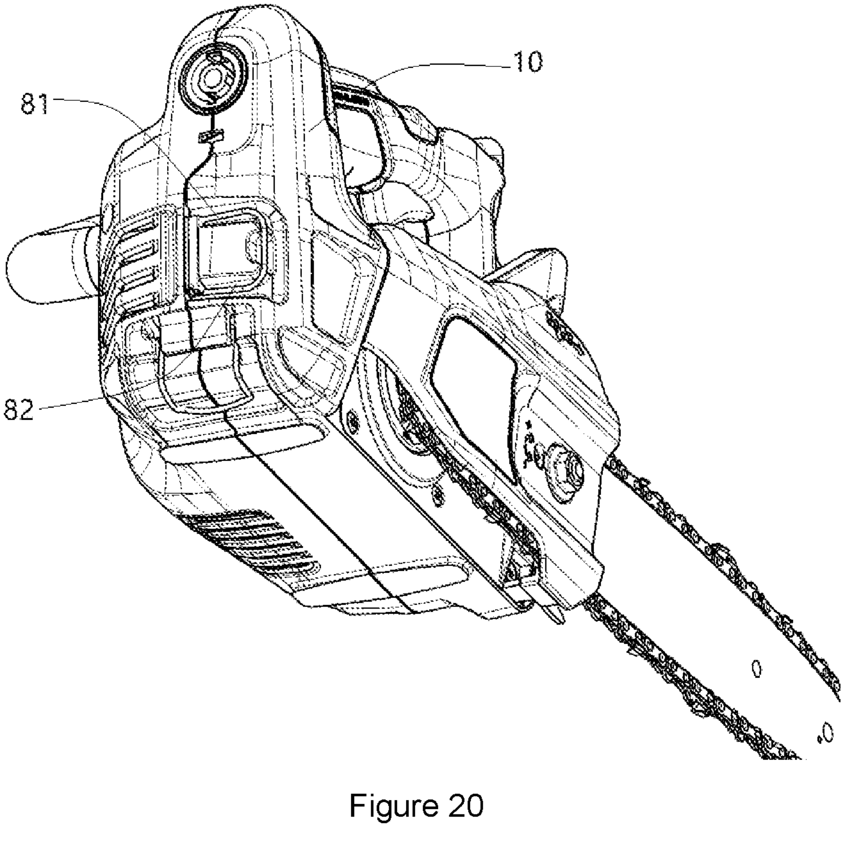
FIG. 20 is a schematic structural view of a storage state of the side hook in the handheld power tool in an embodiment of the disclosure.

Please refer to FIG. 19 and FIG. 20. In an embodiment of the disclosure, a shape of the first connecting component 813 is cylindrical, but it is not limited thereto. The first connecting component 813 may also be in a shape of a cuboid, triangular prism, etc. The specific shape of the first connecting component 813 is not limited, and may be designed according to actual needs. As long as a whole of the side hook 81 may be matched with the side housing groove 82, a limitation of the protruding state of the side hook 81 is realized. A shape of the second connecting component 814 is cylindrical, but it is not limited thereto. The second connecting component 814 may also be in a shape of a cuboid, triangular prism, etc. The specific shape of the second connecting component 814 is not limited, and can be designed according to actual needs. As long as a whole of the side hook 81 may be matched with the side housing groove 82, a limitation of the protruding state of the side hook 81 is realized. A shape of the side operating component 815 is cylindrical, but it is not limited thereto. The side operating component 815 may also be in a shape of a cuboid, triangular prism, etc. The specific shape of the side operating component 815 is not limited, and may be set according to actual needs, as long as a whole of the side hook 81 may be matched with the side housing groove 82, a limitation of the storage state of the side hook 81 is realized.

Please refer to FIG. 19 and FIG. 20. In an embodiment of the disclosure, a connection between the first side rotating shaft 811 and the first connecting component 813 may be curved, but it is not limited thereto. The first side rotating shaft 811 and the first connecting component 813 may also be directly connected. The connection between the first side rotating shaft 811 and the first connecting component 813 may form a certain angle. A connection between the first connecting component 813 and the side operating component 815 may be curved, but it is not limited thereto. The first connecting component 813 and the side operating component 815 may also be directly connected. The connection between the first connecting component 813 and the side operating component 815 may form a certain angle. A connection between the side operating component 815 and the second connecting component 814 can be curved, but it is not limited thereto. The side operating component 815 and the second connecting component 814 may also be directly connected. The connection between the side operating component 815 and the second connecting component 814 can form a certain angle. A connection between the second connecting component 814 and the second side rotating shaft 812 may also be curved, but it is not limited thereto. The second connecting component 814 may also be directly connected with the second side rotating shaft 812. The connection between the second connecting component 814 and the second side rotating shaft 812 may form a certain angle. In this embodiment, the connection between the first side rotating shaft 811 and the first connecting component 813 is curved, the connection between the first connecting component 813 and the side operating component 815 is curved, the connection between the side operating component 815 and the second connecting component 814 is curved, and the connection between the second connecting component 814 and the second side rotating shaft 812 is curved, which may facilitate a positioning of the side hook 81 through the side housing groove 82.

Figure 21:
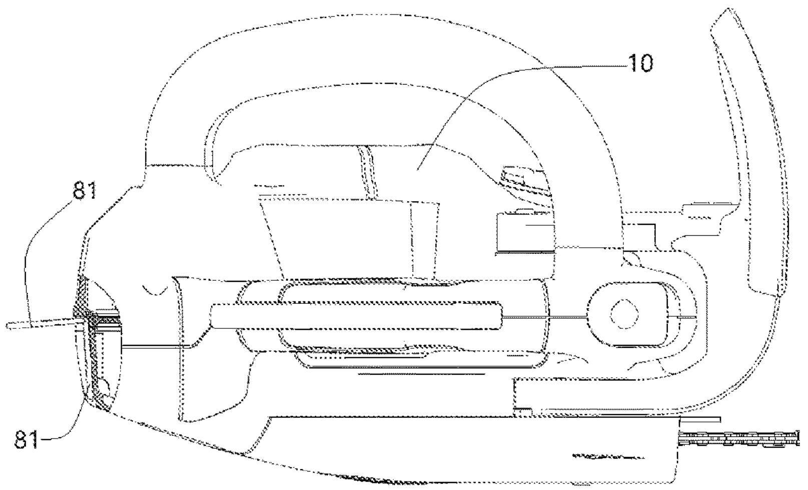
FIG. 21 is a schematic structural view of a structure of the side hook in different states of the handheld power tool in an embodiment of the disclosure.
Figure 22:
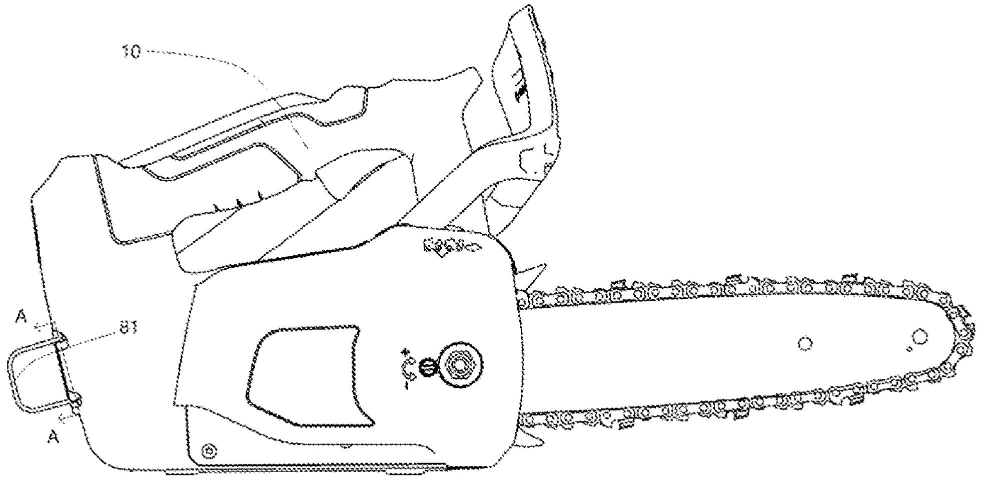
FIG. 22 is a front view of FIG. 20.

Please refer to FIG. 19, FIG. 21 and FIG. 22. In an embodiment of the disclosure, the first side rotating shaft 811 and the second side rotating shaft 812 may be respectively pivotally connected with two rotating holes opened in the housing assembly 10, and the two rotating holes may communicate with each other or not communicate with each other. When the side hook 81 is in the protruding position, in order to realize a positioning of the side hook 81 to prevent the side hook 81 from returning to the storage position, at this time, a distance between the connection point of the first side rotating shaft 811 and the first connecting component 813, and the connection point of the second side rotating shaft 812 and the second connecting component 814 is marked as a first distance. A distance between the connection point of the first connecting component 813 and the side operating component 815, and the connection point of the second connecting component 814 and the side operating component 815 is marked as a second distance, wherein, the first distance is smaller than the second distance, which means that the whole of the side hook 81 may be approximated as an isosceles trapezoid, and the first side rotating shaft 811 and the second side rotating shaft 812 are located on a shorted side of the two parallel sides of the isosceles trapezoid. When a distance between one end of the first connecting component 813 and the second connecting component 814 increases, a certain elastic force will be generated inside the side hook 81 to drive the first connecting component 813 and the second connecting component 814 to return back to the protruding position.

Figure 23:
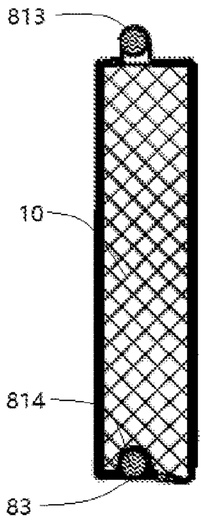
FIG. 23 is a cross-sectional view along A-A direction in FIG. 22.

Please refer to FIG. 23. In an embodiment of the disclosure, in order to be able to limit the side hook 81 and prevent the side hook 81 from automatically changing from the protruding state to the storage state during use, a side protruding limiting groove 83 may be arranged on one side of the above-mentioned one of the rotating holes, and the side protruding limiting groove 83 may be matched with one end of the second connecting component 814. When the side hook 81 is converted from the storage state to the protruding state, the side hook 81 may be rotated at this time, and the side hook 81 begins to disengage from the side housing groove 82. At this time, since a distance between one end of the first connecting component 813 and one end of the second connecting component 814 is greater than the first distance, which means that the first connecting component 813 and the second connecting component 814 are affected by an internal elastic force, and one end of the first connecting component 813 and the second connecting component 814 tends to approach each other. It means that the first connecting component 813 and the second connecting component 814 can be elastically deformed relative to the side operating component 815. When the first connecting component 813 and the second connecting component 814 are elastically deformed, a distance between the first side rotating shaft 811 and the second side rotating shaft 812 may change accordingly. Since a shape of the side housing groove 82 matches the shape of the side hook 81, and one of the rotating holes is provided with a side protruding limiting groove 83, when the side hook 81 starts to disengage from the side housing groove 82, the first connecting component 813 and the second connecting component 814 will automatically shrink inward until one end of the second connecting component 814 is embedded into the side protruding limiting groove 83, at this time, the distance between one end of the first connecting component 813 and one end of the second connecting component 814 decreases. At the same time, when one end of the second connecting component 814 is embedded into the side protruding limiting groove 83, one end of the second connecting component 814 will collide with the side protruding limiting groove 83, and a sound will be generated to remind the operator that the side hook 81 is already in the protruding state. In this embodiment, the side protruding limiting groove 83 is matched with one end of the second connecting component 814. In other embodiments, the side protruding limiting groove 83 may also be mounted on one side of another rotating hole. The side protruding limiting groove 83 may be matched with one end of the first connecting component 813. Certainly, one side of the two rotating holes may be provided with the side protruding limiting grooves 83, and the first connecting component 813 and the second connecting component 814 may be respectively matched with the two side protruding limiting grooves 83, which may also realize a limiting of the protruding state of the side hook 81.

Figure 24:
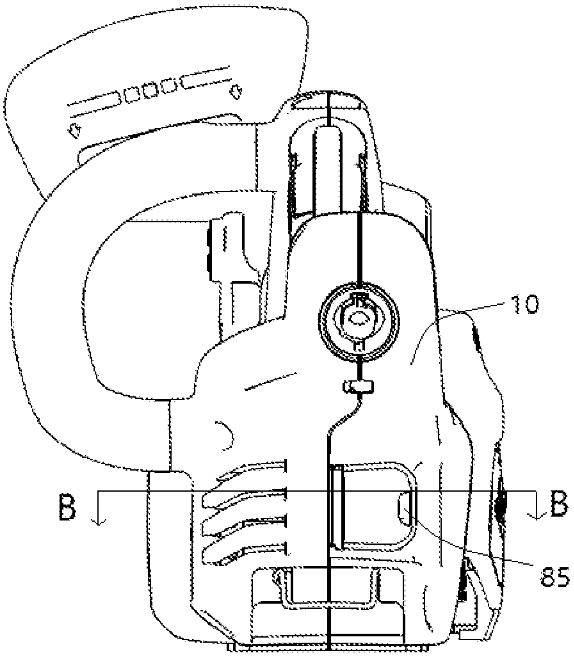
FIG. 24 is a side view of FIG. 20.
Figure 25:
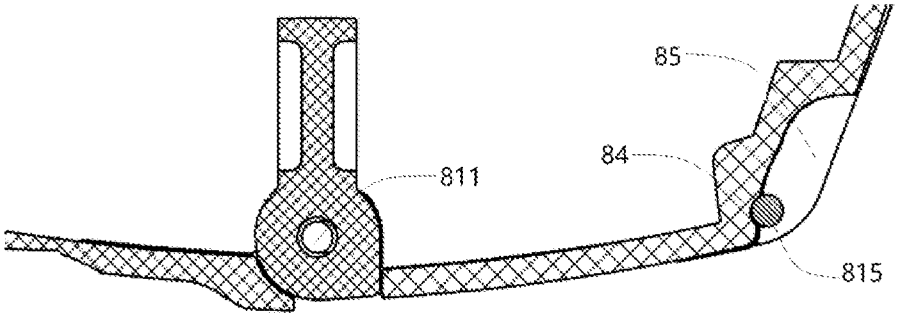
FIG. 25 is a cross-sectional view along B-B direction in FIG. 24.

Please refer to FIG. 23, FIG. 24 and FIG. 25. In an embodiment of the disclosure, when the side hook 81 needs to be converted from the protruding state to the storage state, the side hook 81 may be rotated at this time, and the side hook 81 begins to disengage from the side protruding limiting groove 83. With a rotation of the side hook 81, the distance between one end of the first connecting component 813 and one end of the second connecting component 814 will increase, and an elastic force will be generated inside the side hook 81. In order to realize the limiting of the side hook 81, the side housing limiting groove 84 may be arranged on a side of the side housing groove 82 away from the rotating hole. When the side hook 81 rotates, the side hook 81 starts to disengage from the side protruding limiting groove 83, the first connecting component 813 and the second connecting component 814 will automatically expand outward until the side operating component 815 rotates along one side of the side housing groove 82 and is embedded into the side housing limiting groove 84, at this time, a limiting of the storage state of the side hook 81 may be realized. At the same time, when the side operating component 815 is embedded into the side housing limiting groove 84, the side operating component 815 will collide with the side housing limiting groove 84, and a sound will be generated to remind the operator that the side hook 81 is in the storage state.

Please refer to FIG. 24 and FIG. 25. In an embodiment of the disclosure, when the side hook 81 is in the storage state, since the side operating component 815 of the side hook 81 is embedded in the side housing limiting groove 84, it is not easy for the operator to directly separate the side operating component 815 from the side housing limiting groove 84. In order to facilitate the operator to rotate the side hook 81, a side operating groove 85 may be arranged on the housing assembly 10, and the side operating groove 85 may be located in the side housing limiting groove 84. At the same time, a depth and width of the side operating groove 85 may be greater than a depth and width of the side housing limiting groove 84, so that the operator may take out the side operating component 815 from the side housing limiting groove 84 through the side operating groove 85, and the side hook 81 changes from the storage state to the protruding state. At this time, a plane where the side hook 81 is located may form a certain angle with a plane where a side surface of the housing assembly 10 is located, and the angle may be 90°, or 85°, 80°, etc. Certainly, a rotation direction of the side hook 81 is also not limited.

Figure 26:
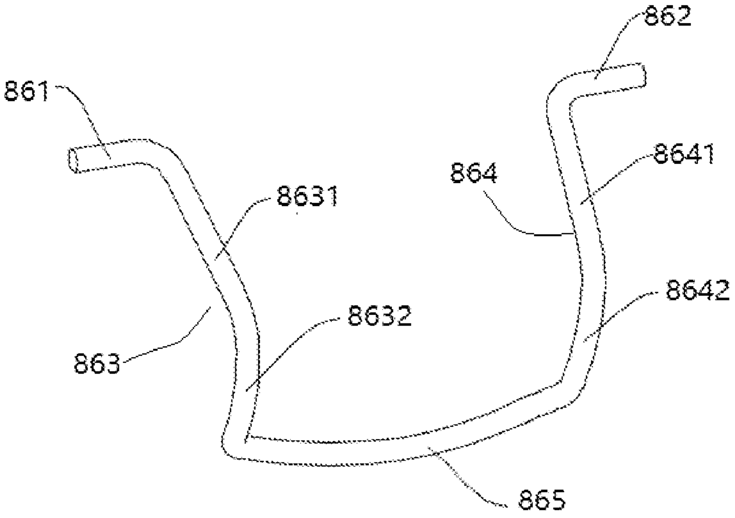
FIG. 26 is a schematic structural view of a bottom hook of the hook assembly in the handheld power tool according to an embodiment of the disclosure.

Please refer to FIG. 26. In an embodiment of the disclosure, the bottom hook 86 may include a first bottom rotating shaft 861, a second bottom rotating shaft 862, a first leg 863, a second leg 864 and a bottom operating component 865. The first bottom rotating shaft 861 may be formed on the first leg 863, and the second bottom rotating shaft 862 may be formed on the second leg 864. Wherein, the first leg 863 may include a first front leg 8631 and a first rear leg 8632, and the second leg 864 may include a second front leg 8641 and a second rear leg 8642. The first bottom rotating shaft 861, the first front leg 8631, the first rear leg 8632, the bottom operating component 865, the second rear leg 8642, the second front leg 8641 and the second bottom rotating shaft 862 are connected with each other to form an overall structure and a shape of the overall structure which is roughly U-shaped. Wherein, the bottom operating component 865, part of the first leg 863 and part of the second leg 864 may be located on the same plane, which is recorded as a first plane, and the second bottom rotating shaft 862, part of the first leg 863 and part of the second leg 864 may be located on the same plane, which is recorded as a second plane. The first plane intersects with the second plane. The first bottom rotating shaft 861 and the second bottom rotating shaft 862 are located on a same pivot axis, and the first bottom rotating shaft 861 and the second bottom rotating shaft 862 are pivotally connected with the power tool. In this embodiment, a desired shape of the bottom hook 86 may be achieved by sequentially bending a long rod, or the bottom hook 86 may also be produced by integral molding.

Please refer to FIG. 26. In an embodiment of the disclosure, specifically, a shape of the first front leg 8631 is a cylinder, and may also be a cuboid, a triangular prism, and the like. A shape of the second front leg 8641 is cylindrical, also may be cuboid, triangular prism and so on. A shape of the first rear leg 8632 is a cylinder, and may also be a cuboid, a triangular prism, and the like. A shape of the second rear leg 8642 is a cylinder, and may also be a cuboid, a triangular prism, etc.

Figure 28:
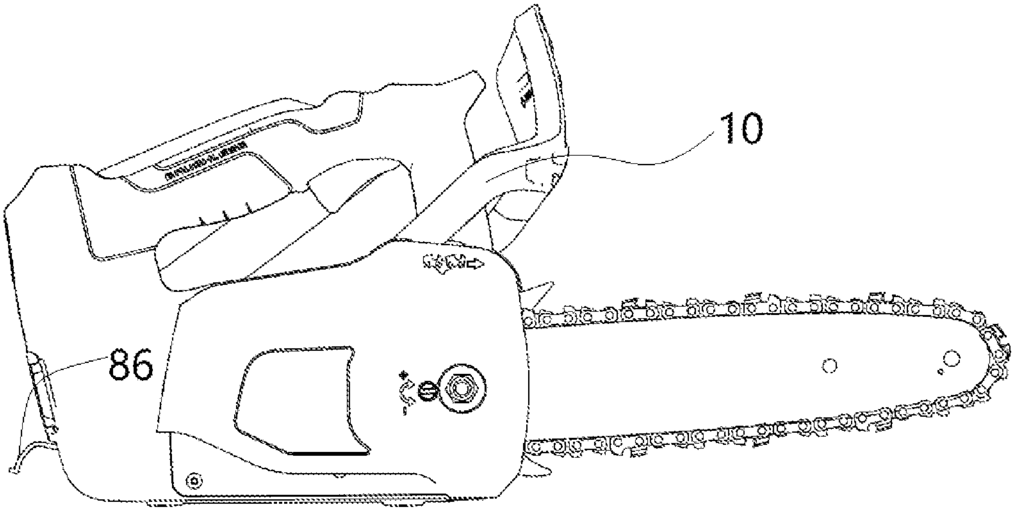
FIG. 28 is a schematic structural view of a protruding state of the bottom hook in the handheld power tool in an embodiment of the disclosure.

Please refer to FIG. 26 and FIG. 28. In an embodiment of the disclosure, specifically, a connection between the first bottom rotating shaft 861 and the first front leg 8631 may be curved, and the connection between the first bottom rotating shaft 861 and the first front leg 8631 may form a certain angle. A connection between the first front leg 8631 and the first rear leg 8632 may be curved, and the connection between the first front leg 8631 and the first rear leg 8632 may form a certain angle. Wherein the angle between the first front leg 8631 and the first rear leg 8632 is greater than 90° and less than 170°, and a bending angle at the connection between the first front leg 8631 and the first rear leg 8632 and a bending angle at a connection between the side surface and a bottom surface of the housing assembly 10 may be the same. A connection between the first rear leg 8632 and the bottom operating component 865 may be curved, and the connection between the first rear leg 8632 and the bottom operating component 865 may form a certain angle. A connection between the bottom operating component 865 and the second rear leg 8642 may be curved, and the connection between the bottom operating component 865 and the second rear leg 8642 may form a certain angle. A connection between the second rear leg 8642 and the second front leg 8641 may be curved, and the connection between the second rear leg 8642 and the second front leg 8641 may form a certain angle. Wherein the angle between the second rear leg 8642 and the second front leg 8641 is greater than 90° and less than 170°, and the bending angle at the connection between the second rear leg 8642 and the second front leg 8641 and the bending angle at the connection between the side surface and the bottom surface of the housing assembly 10 may be the same. A connection between the second front leg 8641 and the second bottom rotating shaft 862 may be curved, and the connection between the second front leg 8641 and the second bottom rotating shaft 862 may form a certain angle.

Figure 27:
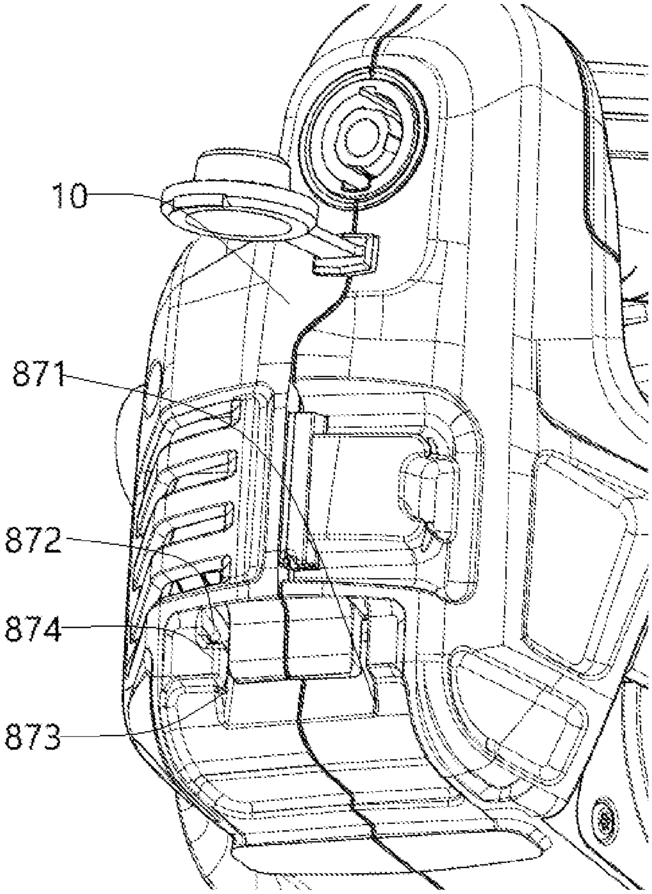
FIG. 27 is a schematic structural view of a storage state of the bottom hook of the handheld power tool in an embodiment of the disclosure.

Please refer to FIG. 27. In an embodiment of the disclosure, the housing assembly 10 may be provided with a bottom housing groove 871, a bottom protruding limiting groove 872, a limiting block 874 and a bottom housing limiting groove 873. Wherein, the bottom housing groove 871 may be arranged at a connection between the side surface and the bottom surface of the housing assembly 10, the bottom hook 86 may be rotatably arranged in the bottom housing groove 871, and the bottom housing groove 871 may be provided with the bottom protruding limiting groove 872, the limiting block 874 and the bottom housing limiting groove 873. The bottom protruding limiting groove 872 is located at a connection of the bottom housing groove 871 and a first end of the limiting block 874, and the bottom housing limiting groove 873 is located at a connection of the bottom housing groove 871 and a second end of the limiting block 874. The bottom protruding limiting groove 872 and the bottom housing limiting groove 873 may be matched with the bottom hook 86 respectively, so that the bottom hook 86 may have different limiting states, for example, when the bottom hook 86 is matched with the bottom protruding limiting groove 872, the bottom hook 86 is in the protruding state, and when the bottom hook 86 is matched with the bottom housing limiting groove 873, the bottom hook 86 is in the storage state.

Please refer to FIG. 26 and FIG. 27. In an embodiment of the disclosure, the first bottom rotating shaft 861 and the second bottom rotating shaft 862 are respectively pivotably connected with two rotating holes opened in the bottom housing groove 871, and one end of the first bottom rotating shaft 861 and one end of the second bottom rotating shaft 862 are away from each other. When the bottom hook 86 is at a position of the bottom protruding limiting groove 872, which means that when the bottom hook 86 is in the protruding state, in order to realize a positioning of the bottom hook 86, a distance between the first bottom rotating shaft 861 and the second bottom rotating shaft 862 is recorded as a third distance. When the bottom hook 86 is in a position of the bottom housing limiting groove 873, which means that when the bottom hook 86 is in the storage state, the distance between the first bottom rotating shaft 861 and the second bottom rotating shaft 862 is recorded as a fourth distance, wherein the third distance is greater than the fourth distance.

Please refer to FIG. 26, FIG. 27 and FIG. 28. In an embodiment of the disclosure, one side of a rotating hole of the bottom housing groove 871 may be provided with the bottom protruding limiting groove 872, and the bottom protruding limiting groove 872 may be matched with one end of the first front leg 8631. When the bottom hook 86 is rotated, the bottom hook 86 disengages from the bottom housing limiting groove 873. At this time, the first front leg 8631, the second front leg 8641, the first rear leg 8632 and the second rear leg 8642 are affected by an internal elastic force, and can be elastically deformed relative to the bottom operating component 865. When the bottom hook 86 passes through the limiting block 874, the first front leg 8631 will automatically expand outwards until one end of the first front leg 8631 is embedded into the bottom protruding limiting groove 872, and one end of the first front leg 8631 will collide with an inner wall of the bottom protruding limiting groove 872, which generate a sound to remind the operator that the bottom hook 86 is in the protruding state. In another embodiment, the bottom protruding limiting groove 872 may also be arranged on one side of the other rotating hole, and the bottom protruding limiting groove 872 may be matched with one end of the second front leg 8641. In another embodiment, one side of the two rotating holes of the bottom housing groove 871 may be provided with the bottom protruding limiting grooves 872, and the two bottom protruding limiting grooves 872 may also be matched with the first front leg 8631 and the second front leg 8641 respectively. Mounting positions and quantity of the limiting block 874 and the bottom housing limiting groove 873 may be changed according to a position and quantity of the bottom protruding limiting groove 872. When a number of the bottom protruding limiting groove 872 is one, the mounting positions of the bottom protruding limiting groove 872, the limiting block 874 and the bottom housing limiting groove 873 need to be located on one side of one of the rotating holes.

Please refer to FIG. 26, FIG. 27 and FIG. 28. In an embodiment of the disclosure, when the bottom hook 86 is retracted, the operator may compress the first front leg 8631 and the second front leg 8641 inwardly, and the first front leg 8631 and/or the second front leg 8641 may be separated from the bottom protruding limiting groove 872. Through rotating the bottom hook 86, when the first front leg 8631 passes through the limiting block 874, the first front leg 8631 will be embedded in the bottom housing limiting groove 873, the bottom hook 86 is retracted, and the bottom hook 86 is attached into the bottom housing groove 871, which will not affect a normal operation of the operator. When it is necessary to convert the bottom hook 86 from the storage state to the protruding state, in order to facilitate the operator to rotate the bottom hook 86, the bottom operating component 865 may be configured as an arc rod, and a protruding part of the bottom operating component 865 may be separated from the bottom housing groove 871. A plane in which the first front leg 8631 and the second front leg 8641 in the bottom hook 86 are located may form a certain angle with the plane of the side surface of the housing assembly 10, and the angle may be 90°, or 85°, 80° etc. The rotating direction of the bottom hook 86 may also be unrestricted. A plane of the rotating direction of the bottom hook 86 may be perpendicular to, parallel to, or form a certain angle with a plane of a rotating direction of the chain 43 of the handheld power tool, and the angle may be 85°, 80°, 20°, etc.

Figure 29:
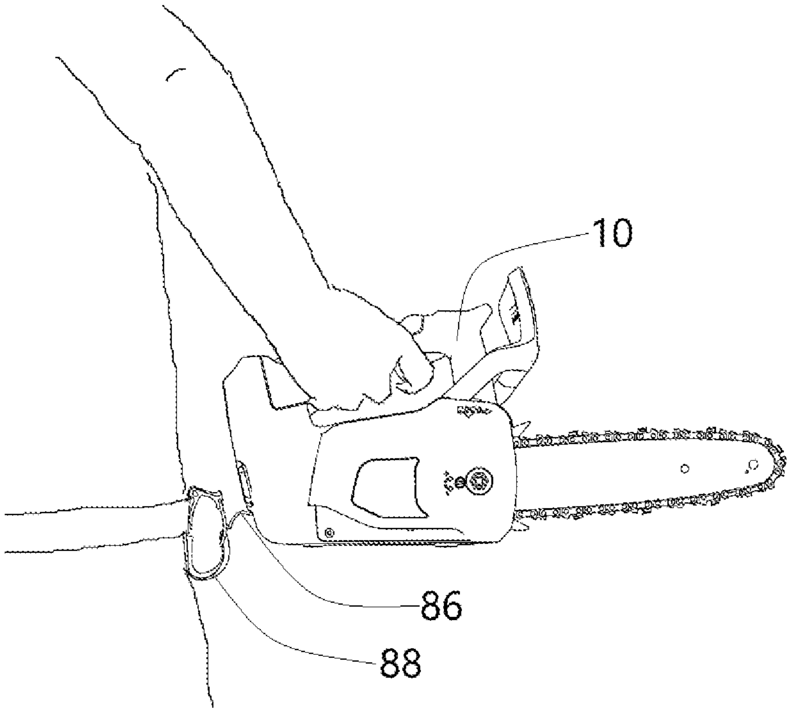
FIG. 29 is a schematic structural view of a structure of the handheld power tool in a hanging process in an embodiment of the disclosure.
Figure 30:
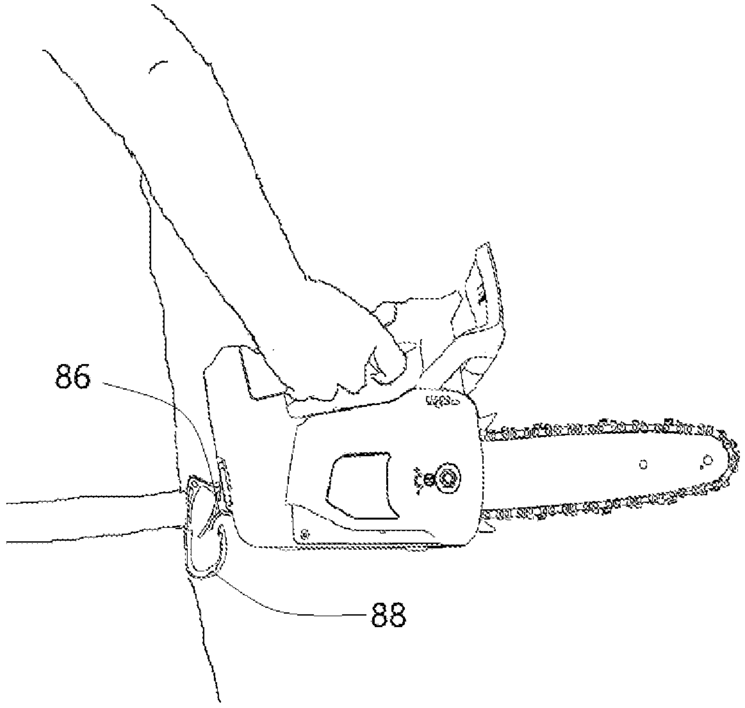
FIG. 30 is another schematic structural view of the handheld power tool in the hanging process in an embodiment of the disclosure.
Figure 31:
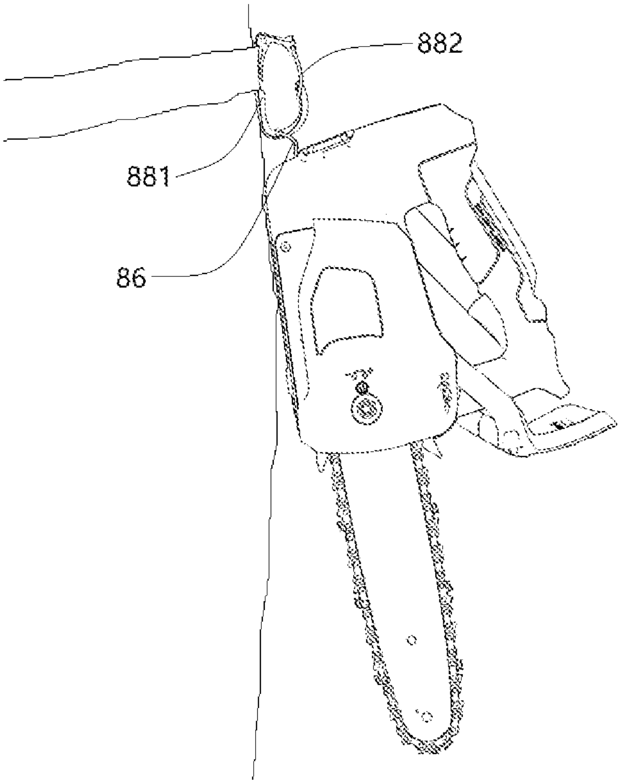
FIG. 31 is a schematic structural view of the handheld power tool in a hanging state in an embodiment of the disclosure.

Please refer to FIG. 29, FIG. 30 and FIG. 31. In an embodiment of the disclosure, when the operator hangs the handheld power tool on the body, the side hook 81 and/or the bottom hook 86 may be matched with a tool buckle 88 on the operator's body. Taking the bottom hook 86 as an example for illustration, the bottom hook 86 may be connected with the tool buckle 88 to realize a hanging of the handheld power tool. The tool buckle 88 may include a hook body 881 and a rotating component 882. The hook body 881 may be fixed on the operator's body, and the rotating component 882 may be rotatably arranged on the hook body 881. Through the matching of the bottom operating component 865 and the rotating component 882, a hanging or detachment of handheld power tool may be realized.

Please refer to FIG. 29, FIG. 30 and FIG. 31. In an embodiment of the disclosure, when the operator hangs the handheld power tool on the tool buckle 88, he may lift the power tool with one hand and move it toward the tool buckle 88. The bottom operating component 865 of the bottom hook 86 is in contact with the rotating component 882 of the tool buckle 88. Since the bottom hook 86 is limited by the bottom protruding limiting groove 872, the bottom hook 86 may not rotate. The bottom operating component 865 will push the rotating component 882 to rotate, so that the bottom hook 86 can be located in the tool buckle 88, so as to realize the hanging of the handheld power tool with a single hand.

Figure 32:
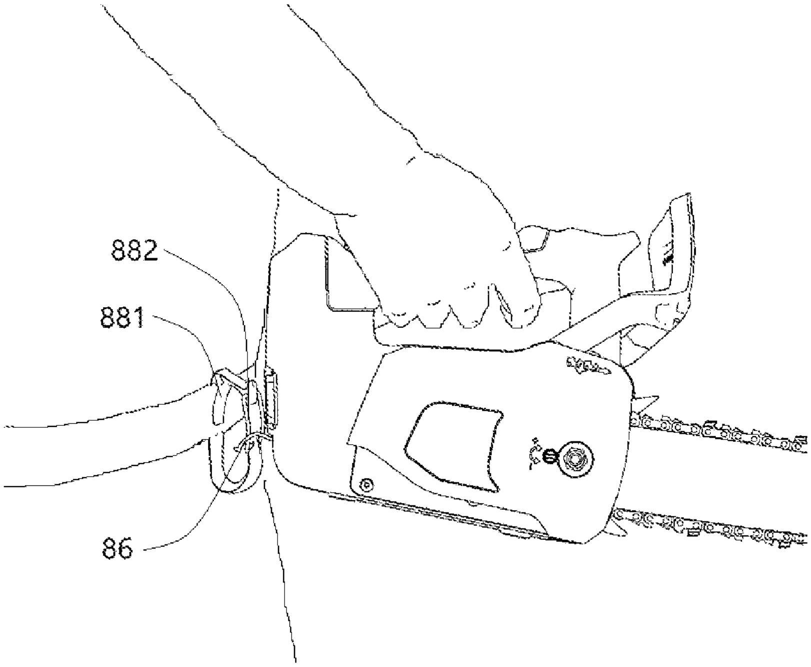
FIG. 32 is a schematic structural view of the handheld power tool in a detached state in an embodiment of the disclosure.
Figure 33:
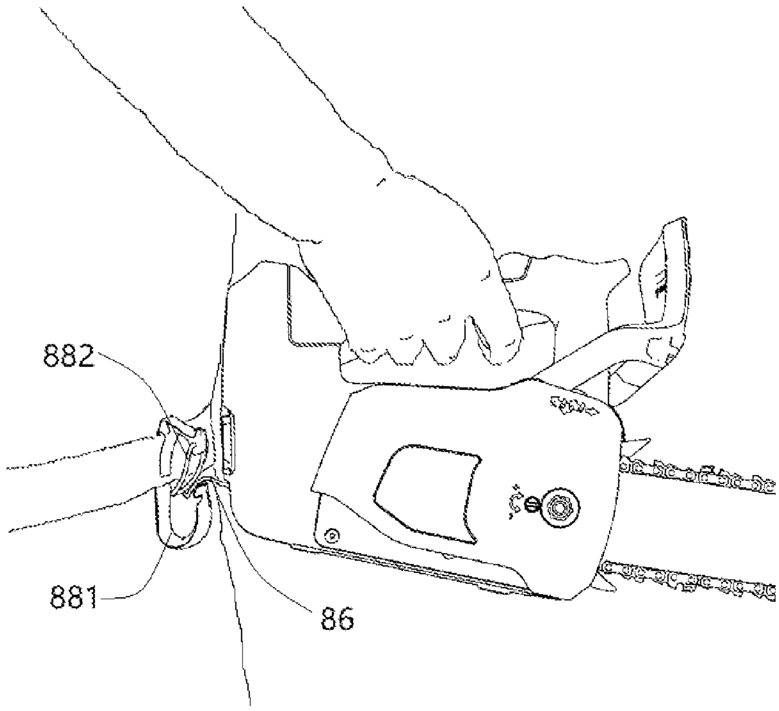
FIG. 33 is another structural schematic view of the handheld power tool in the detached state in an embodiment of the disclosure.
Figure 34:
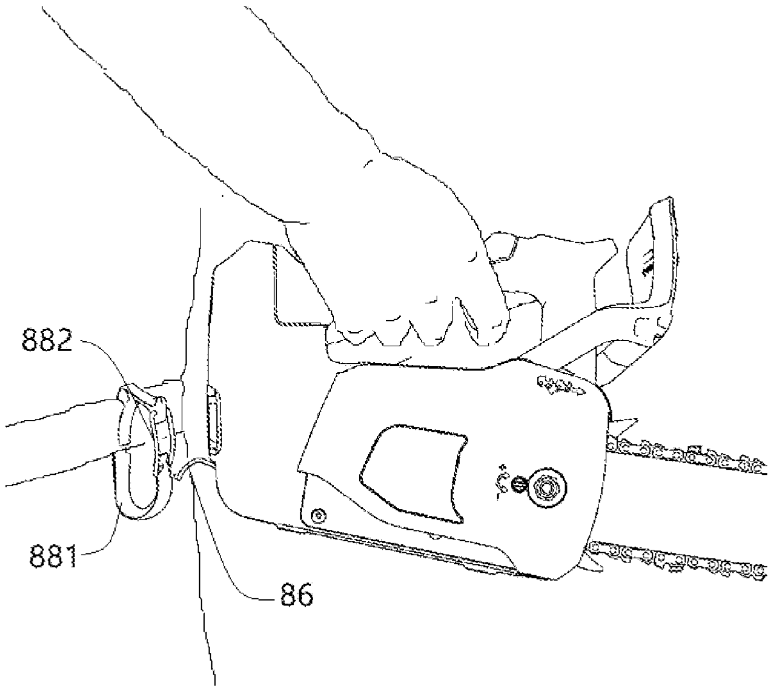
FIG. 34 is yet another structural schematic view of the handheld power tool in the detached state in an embodiment of the disclosure.

Please refer to FIG. 32, FIG. 33 and FIG. 34. In an embodiment of the disclosure, when the operator separates the handheld power tool from the tool buckle 88, he can lift the handheld power tool with one hand and control the bottom operating component 865 to move toward the rotating component 882. When the bottom operating component 865 is located on a lower side of the rotating component 882, the operator may rotate the handheld power tool, and the first rear leg 8632 or the second rear leg 8642 will contact the rotating component 882. The first rear leg 8632 or the second rear leg 8642 will push the rotating component 882 to rotate inward, and the operator may lift the bottom hook 86 of the handheld power tool upward with one hand to separate from the tool buckle 88.

Figure 35:
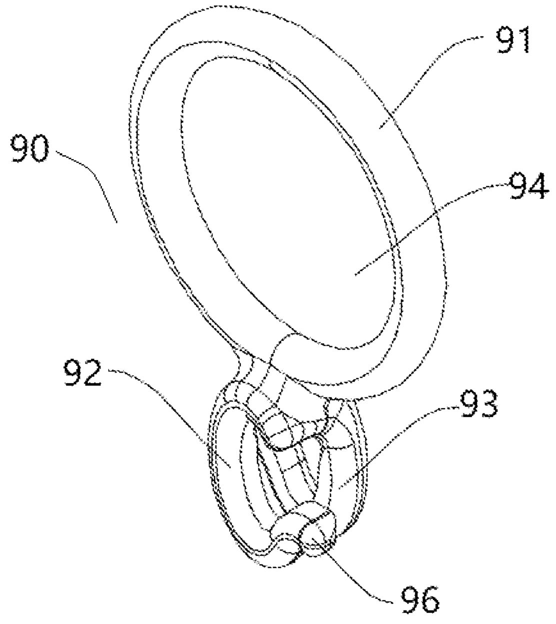
FIG. 35 is a schematic structural view of a hanging ring assembly in the handheld power tool according to an embodiment of the disclosure.
Figure 36:
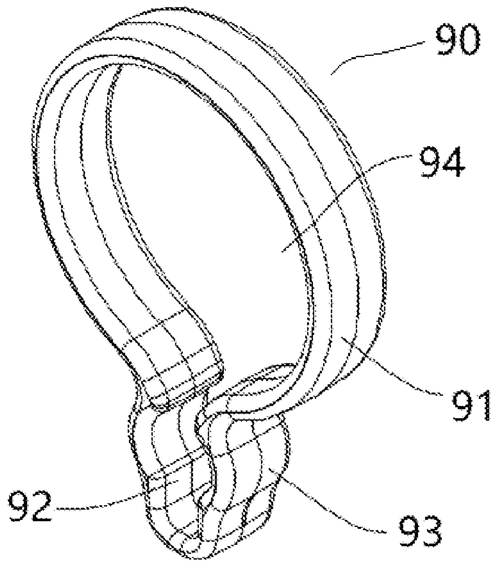
FIG. 36 is a schematic structural view of another structure of the hanging ring assembly in the handheld power tool in an embodiment of the disclosure.

Please refer to FIG. 35 and FIG. 36. In an embodiment of the disclosure, in order to organize the power cable 61 of the handheld power tool and prevent an excessively long power cable 61 from affecting the normal operation of the operator when the operator is using the handheld power tool, so a hanging ring assembly 90 may also be mounted on the handheld power tool, the hanging ring assembly 90 may organize the power cable 61. The hanging ring assembly 90 may include a hanging body 91, a first fixing body 92, a second fixing body 93 and a first opening 94. The hanging body 91 may be provided with the first opening 94, and the hanging body 91 may be positioned through the first opening 94. The hanging body 91 may be circular, elliptical, or square, and a specific shape of the hanging body 91 may be configured according to actual needs. The first opening 94 may be circular, elliptical, or rectangular, and a specific shape of the first opening 94 may be configured according to actual needs, as long as the hanging body 91 can be positioned through the first opening 94.

Please refer to FIG. 35. In an embodiment of the disclosure, specifically, the first fixing body 92 and the second fixing body 93 may be fixed at one end of the hanging body 91, and the first fixing body 92 and the second fixing body 93 are located on a same side of the hanging body 91. The first fixing body 92 and the hanging body 91, and the second fixing body 93 and the hanging body 91 may be integrally formed, or may be connected by buckles, bolts or bonding.

Figure 37:
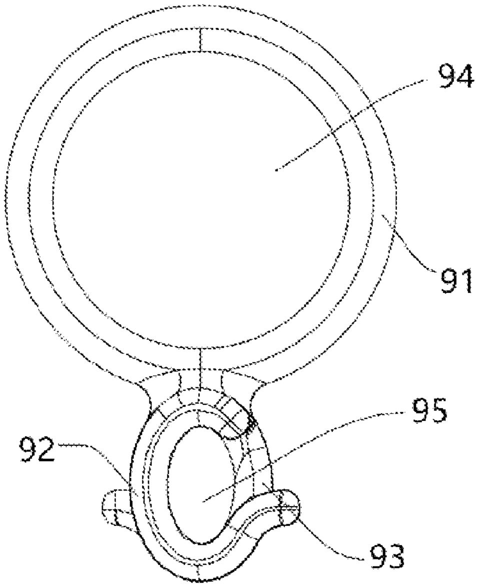
FIG. 37 is a front view of FIG. 35.
Figure 38:
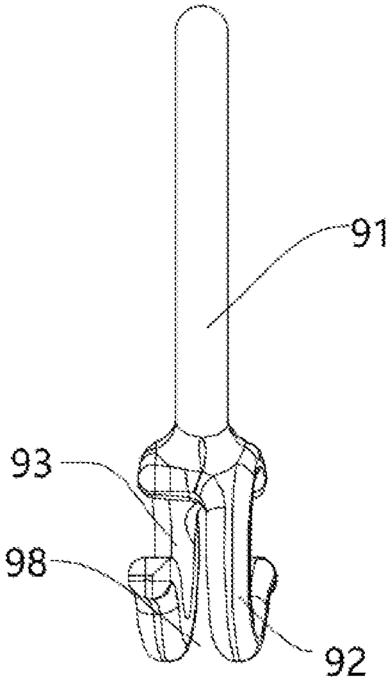
FIG. 38 is a side view of FIG. 35.

Please refer to FIG. 35, FIG. 37 and FIG. 38. In an embodiment of the disclosure, the first fixing body 92 and the second fixing body 93 are separated structures. The first fixing body 92 and the second fixing body 93 may be semi-circular or semi-elliptical. An opening side of the first fixing body 92 may be matched with an opening side of the second fixing body 93 to form a second opening 95. Structures of the first fixing body 92 and the second fixing body 93 may be different, for example, the first fixing body 92 may be semi-elliptical, the second fixing body 93 may be semi-circular arc, and the specific structures of the first fixing body 92 and the second fixing body 93 are not limited, as long as the opening side of the first fixing body 92 and the opening side of the second fixing body 93 may be matched with each other to form the second opening 95. The second opening 95 may be circular, elliptical or rectangular, and a specific shape of the second opening 95 may be configured according to actual needs, as long as the power cable 61 can be clamped through the second opening 95. A first gap 98 may be arranged between the first fixing body 92 and the second fixing body 93. When the first fixing body 92 and the second fixing body 93 are elastically deformed, a size of the first gap 98 changes accordingly. The power cable 61 may pass through the first gap 98 to a position between the first fixing body 92 and the second fixing body 93, and the power cable 61 may be organized through the second opening 95.

Please refer to FIG. 35, FIG. 37 and FIG. 38. In an embodiment of the disclosure, when the power cable 61 needs to be placed in the second opening 95, the power cable 61 may be embedded into the second opening 95 through the first gap 98 between the first fixing body 92 and the second fixing body 93. Of course, since the operator will inevitably drive the power cable 61 to move when using the handheld power tool, in order to prevent the power cable 61 from falling off from the first gap 98 between the first fixing body 92 and the second fixing body 93, ends of the first fixing body 92 and the second fixing body 93 may be provided with a limiting hook 96, and the power cable 61 is further limited by the two limiting hooks 96, which can prevent the power cable 61 from falling off from the first gap 98 between the first fixing body 92 and the second fixing body 93.

Figure 42:
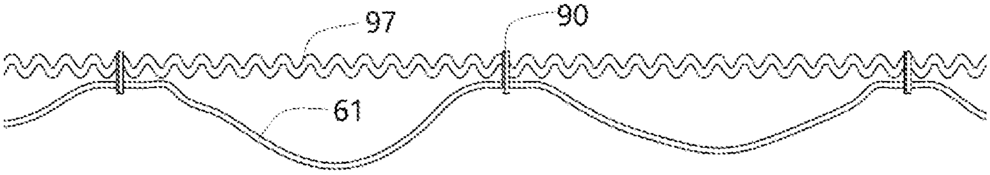
FIG. 42 is a schematic structural view of another use state of the hanging ring assembly in the handheld power tool in an embodiment of the disclosure.

Please refer to FIG. 37, FIG. 38 and FIG. 42. In an embodiment of the disclosure, the first opening 94 and the second opening 95 is not communicated. At this time, the first opening 94 may be hung on a safety rope 97, and the power cable 61 may only be put into the second opening 95 through the first gap 98 between the first fixing body 92 and the second fixing body 93, so as to organize the power cable 61. However, it is not limited thereto, the first opening 94 and the second opening 95 may also be communicated, at this time, the first opening 94 may be hung on the safety rope 97, and the power cable 61 can not only be put into the second opening 95 through the first gap 98 between the first fixing body 92 and the second fixing body 93, but also can be put into the second opening 95 through the first opening 94, which can improve a versatility to a certain extent.

Figure 39:
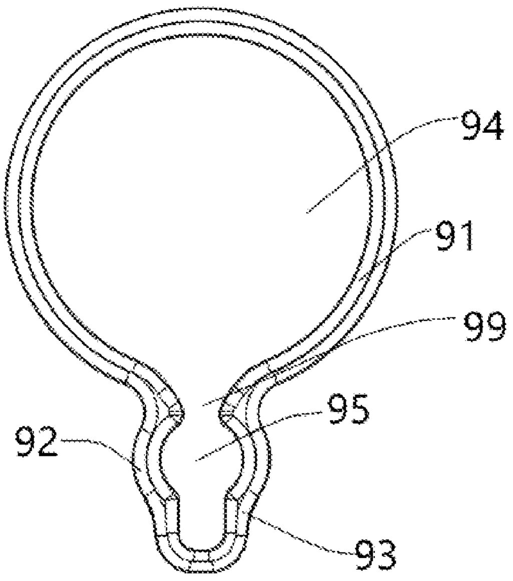
FIG. 39 is a front view of FIG. 36.

Please refer to FIG. 36 and FIG. 39. In an embodiment of the disclosure, the first fixing body 92 and the second fixing body 93 are an integral structure. A first end of the first fixing body 92 is fixed on the hanging body 91, and a first end of the second fixing body 93 is also fixed on the hanging body 91, and a second end of the first fixing body 92 is connected with a second end of the second fixing body 93. The second opening 95 is formed between the first fixing body 92 and the second fixing body 93. The power cable 61 may pass through the second opening 95 to organize the power cable 61. The first fixing body 92 and the second fixing body 93 may be integrally formed, or connected by buckles, bolts or bonding.

Please refer to FIG. 39. In an embodiment of the disclosure, both the first fixing body 92 and the second fixing body 93 may include an arc-shaped structure and an L-shaped structure connected with each other. One end of the arc-shaped structure of the first fixing body 92 may be mounted on the hanging body 91, and one end of the arc-shaped structure of the second fixing body 93 may also be mounted on the hanging body 91. One end of the L-shaped structure of the first fixing body 92 and one end of the L-shaped structure of the second fixing body 93 may be connected with each other, and an opening side of the arc-shaped structure of the first fixing body 92 may be matched with an opening side of the arc-shaped structure of the second fixing body 93 to form the second opening 95. In another embodiment of the disclosure, ends of the L-shaped structure of the first fixing body 92 and the second fixing body 93 may be mounted on the hanging body 91, one end of the arc-shaped structure of the first fixing body 92 may be connected with one end of the arc-shaped structure of the second fixing body 93, and the opening side of the arc-shaped structure of the first fixing body 92 may be matched with the opening side of the arc-shaped structure of the second fixing body 93 to form the second opening 95.

Please refer to FIG. 39. In an embodiment of the disclosure, the first fixing body 92 and the second fixing body 93 may only include arc-shaped structures, and the first ends of the first fixing body 92 and the second fixing body 93 may be mounted on the hanging body 91, the second end of the first fixing body 92 may be connected with the second end of the second fixing body 93, and the opening side of the arc-shaped structure of the first fixing body 92 may be matched with the opening side of the arc-shaped structure of the second fixing body 93 to form the second opening 95. In another embodiment of the disclosure, the first fixing body 92 and the second fixing body 93 may only include L-shaped structures. The first ends of the first fixing body 92 and the second fixing body 93 may be mounted on the hanging body 91, and the second end of the first fixing body 92 is connected with the second end of the second fixing body 93, and one side of the L-shaped structure of the first fixing body 92 may be matched with one side of the L-shaped structure of the second fixing body 93 to form the second opening 95.

Please refer to FIG. 39. In an embodiment of the disclosure, the first opening 94 may communicate with the second opening 95, and a second gap 99 may be formed between the end of the first fixing body 92 fixed on the hanging body 91 and the end of the second fixing body 93 fixed on the hanging body 91. A width of the second gap 99 may not be greater than a diameter of the power cable 61, an inner diameter of the second opening 95 may also not be greater than the diameter of the power cable 61, and the width of the second gap 99 is less than the inner diameter of the second opening 95, which clamps the power cable 61 in the second openings 95. A port of the power cable 61 may pass through the first opening 94, and the power cable 61 may be put into the second opening 95, so as to organize the power cable 61. The second opening 95 may clamp the power cable 61, and the power cable 61 may be limited by the second gap 99, which may further clamp the power cable 61.

Figure 40:
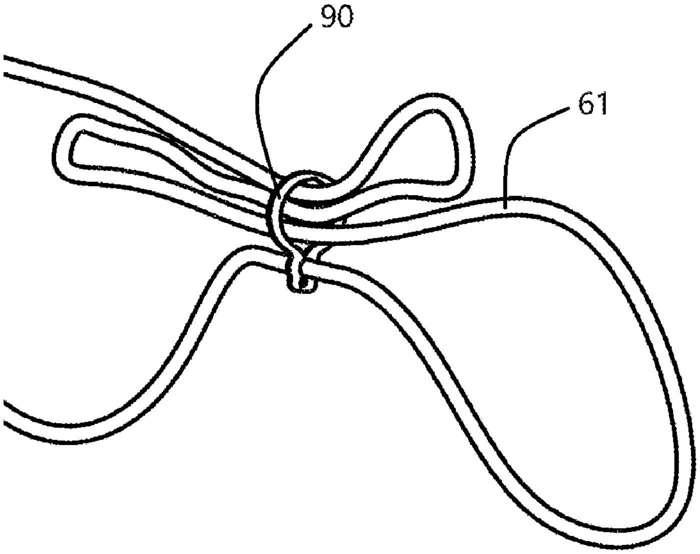
FIG. 40 is a schematic structural view of a use state of the hanging ring assembly in the handheld power tool in an embodiment of the disclosure.
Figure 41:
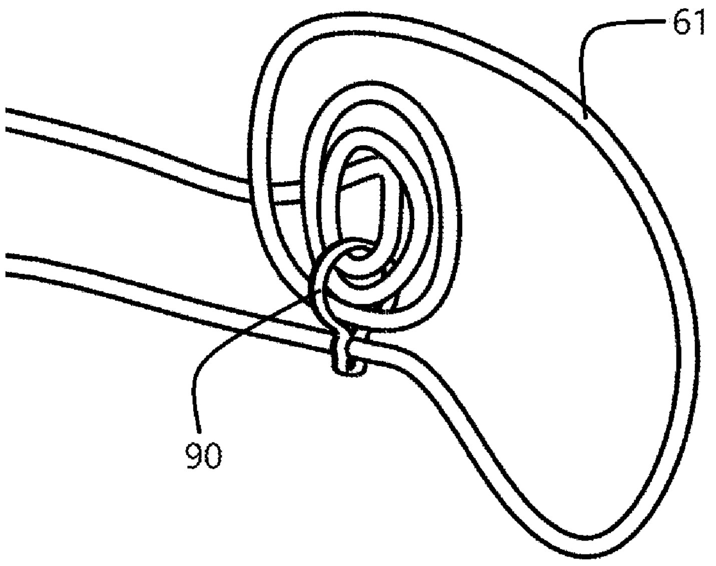
FIG. 41 is a schematic structural view of another use state of the hanging ring assembly in the handheld power tool according to an embodiment of the disclosure.

Please refer to FIG. 40 and FIG. 41. In an embodiment of the disclosure, when the operator does not use the handheld power tool, the power cable 61 of the handheld power tool needs to be accommodated. At this time, the power cable 61 may be wrapped around the first opening 94 of the hanging body 91 to complete the accommodation, or the power cable 61 may be put into the first opening 94 after being folded multiple times, and the power cable 61 folded multiple times is limited by the first opening 94.

Please refer to FIG. 42. In an embodiment of the disclosure, when it is necessary to organize the overlong power cable 61, etc., the safety rope 97 may be hung on a wall or fixed in other places. The safety rope 97 may be sleeved with a plurality of hanging ring assemblies 90, the hanging body 91 is hung on the safety rope 97, and the power cable 61 may pass through the second openings 95 of a plurality of hanging loops in turn, so as to realize an arrangement of the power cable 61.

In summary, through the handheld power tool of the disclosure, the pushing rod penetrates through the main handle, and to start the push-pull assembly, it is only needs to push the pushing rod forward and press down to unlock the switch trigger through the palm of the hand. A running track of the pushing rod is to move forward and slide along the main handle first, and then move downward along a slope of the main handle or the guiding rib. This process may be completed under a thrust of the palm, which can improve a problem of unsatisfactory comfort when using the thumb to unlock the trigger switch. At the same time, the hook assembly and the hanging ring assembly are provided, the operator may hang the power tool on the body through the hook assembly, and store and organize the power cable through the hanging ring assembly, which can improve a convenience of using the power tool.

The embodiments of the disclosure described above are only used to help illustrate the disclosure. The embodiments do not exhaustively describe all the details, nor do they limit the disclosure to the specific embodiments described. Obviously, many modifications and variations are possible according to this specification. The embodiments are specifically described in the specification in order to better explain the principles and practical applications of the disclosure, so that those skilled in the art can well understand and utilize the disclosure. The disclosure is limited only by the claims and their full scope and equivalents.

What is claimed is:

1. A handheld power tool, comprising:
a housing assembly;
a handle assembly, arranged on the housing assembly; and
a switch assembly, arranged on the handle assembly, comprising:
a button assembly, arranged on the housing assembly; and
a push-pull assembly, slidably connected with the handle assembly;
wherein, when the push-pull assembly is configured to complete at least two actions, a first action and a second action, the button assembly is unlocked, the first action is to slide back and forth along the handle assembly, and the second action is to slide back and forth obliquely along the handle assembly;
two symmetrical main supporting blocks are fixedly arranged on both sides of the pushing rod, and two symmetrical auxiliary supporting blocks are fixedly arranged on both sides of the pushing rod, both the two symmetrical main supporting blocks and the two symmetrical auxiliary supporting blocks are capable of a sliding movement once an entire of the pushing rod provides a sliding function;
the two main supporting blocks are slidably arranged in two main sliding limiting grooves respectively, each of the two main sliding limiting grooves comprises a first groove and a second groove, an angle is formed between the first groove and the second groove.

2. The handheld power tool according to claim 1, wherein the push-pull assembly comprises:
a pushing rod, mounted on the handle assembly;
a limiting handle, connected with the pushing rod and forming an angle with the pushing rod; and
a spring, mounted in the handle assembly and connected with one end of the pushing rod.

3. The handheld power tool according to claim 2, wherein after the pushing rod completes at least two actions, the limiting handle is located in a cavity of a trigger switch in the switch assembly.

4. The handheld power tool according to claim 2, wherein the angle of the limiting handle formed with the pushing rod is between 60 degrees and 120 degrees.

5. The handheld power tool according to claim 1, further comprising a hook assembly, wherein
the hook assembly is arranged on the housing assembly, the hook assembly is configured to connect or disconnect a tool buckle with the handheld power tool, the tool buckle is connected with an operator of the handheld power tool.

6. The handheld power tool according to claim 5, wherein the hook assembly comprises a side hook and a bottom hook, the side hook and the bottom hook are pivotally connected with the housing assembly, and pivot axes of the side hook and the bottom hook are substantially perpendicular to each other in space.

7. The handheld power tool according to claim 6, wherein the side hook comprises:
a side operating component;
a first connecting component, connected with a first end of the side operating component; and
a second connecting component, connected with a second end of the side operating component;
wherein, the first connecting component and the second connecting component are capable of elastic deformation relative to the operating component.

8. The handheld power tool according to claim 7, wherein the side hook further comprises:
a first side rotating shaft, connected with the first connecting component, and pivotally connected in a side housing groove of the housing assembly; and
a second side shaft, connected with the second connecting component and pivotally connected in the side housing groove;
wherein, when the first connecting component and the second connecting component are elastically deformed, a distance between the first side rotating shaft and the second side rotating shaft is variable.

9. The handheld power tool according to claim 6, wherein the bottom hook comprises:
a first leg, a first bottom rotating shaft being formed on the first leg;
a second leg, a second bottom rotating shaft being formed on the second leg; and
a bottom operating component, connecting the first leg with the second leg;
wherein, the bottom operating component and at least part of the first leg and at least the second leg are located on a first plane, the first bottom rotating shaft, the second bottom rotating shaft and at least part of the first leg and at least the second leg are located in a second plane, and the first plane intersects the second plane.

10. The handheld power tool according to claim 9, wherein
the first leg comprises a first front leg and a first rear leg, the second leg comprises a second front leg and a second rear leg, the first front leg and the second front leg are located in the first plane, and the first rear leg and the second rear leg are located in the second plane.

11. The handheld power tool according to claim 9, wherein
the bottom operating component contacts a rotating component of the tool buckle, so that the handheld power tool is connected with the tool buckle, and the first leg or the second leg contacts the rotating component, and the handheld power tool is disengaged from the tool buckle.

12. The handheld power tool according to claim 1, further comprising a battery assembly, wherein
the battery assembly and the housing assembly are two separate parts, and the battery assembly comprises:
a battery holder;
a battery pack, arranged in the battery holder, configured to provide energy to electrical components in the housing assembly; and
a power cable, connected between the battery pack and the housing assembly.

13. The handheld power tool according to claim 1, further comprising a hanging ring assembly, configured to organize the power cable, wherein the hanging ring assembly comprises:

a hanging body, provided with a first opening;

a first fixing body, arranged on a first end of the hanging body; and a second fixing body, arranged on a second end of the hanging body;

wherein, a second opening is formed between the first fixing body and the second fixing body.

14. The handheld power tool according to claim 13, wherein the first fixing body and the second fixing body are capable of being elastically deformed relative to the hanging body.

15. The handheld power tool according to claim 14, wherein a first gap is formed between the first fixing body and the second fixing body, and when the first fixing body and the second fixing body deform elastically, the first gap is variable.

16. The handheld power tool according to claim 13, wherein the first opening communicates or not communicate with the second opening.

17. The handheld power tool according to claim 16, wherein when the first opening does not communicate with the second opening, a second gap is formed between one end of the first fixing body and one end of the second fixing body, and a width of the second gap is smaller than an inner diameter of the second opening, and the width of the second gap is smaller than an outer diameter of the power cable.

18. The handheld power tool according to claim 1, wherein a direction of the first groove is substantially parallel to a direction of the pushing rod, and the second groove is located at an end of the first groove.

19. The handheld power tool according to claim 1, further comprising a heat dissipation assembly, wherein the heat dissipation assembly comprises:

an air guiding ring, arranged on a driving motor, and an air passage being formed between the air guiding ring and the housing assembly;

a heat dissipation device, arranged in the housing assembly and located in the air passage;

an air inlet, communicating with the air passage and arranged on a side of the housing assembly; and an air outlet, communicating with the air passage and arranged on a bottom surface of the housing assembly.

20. The handheld power tool according to claim 1, further comprising a protection assembly, wherein the protection assembly comprises a protection cover, a first end of the protection cover is connected with the housing assembly, and a cover part is formed on a second end of the protection cover, the cover part covers a power port of the housing assembly and fits with the housing assembly around the power port to form a sealing surface.

* * * * *